(12) United States Patent
Line et al.

(10) Patent No.: US 9,415,713 B2
(45) Date of Patent: *Aug. 16, 2016

(54) FLEXIBLE SEATBACK SYSTEM

(71) Applicant: Ford Global Technologies, LLC, Dearborn, MI (US)

(72) Inventors: Johnathan Andrew Line, Northville, MI (US); Daniel Ferretti, Commerce Township, MI (US); Kevin VanNieulande, Fraser, MI (US); Marc Silva Kondrad, Macomb Township, MI (US); John W. Jaranson, Dearborn, MI (US); Kendrick Alden Harper, Temperance, MI (US); Grant A. Compton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/609,092

(22) Filed: Jan. 29, 2015

(65) Prior Publication Data

US 2015/0145303 A1 May 28, 2015

Related U.S. Application Data

(63) Continuation-in-part of application No. 13/749,561, filed on Jan. 24, 2013.

(51) Int. Cl.
*A47C 27/00* (2006.01)
*B60N 2/64* (2006.01)
(Continued)

(52) U.S. Cl.
CPC .............. *B60N 2/643* (2013.01); *B60N 2/0232* (2013.01); *B60N 2/2222* (2013.01); *B60N 2/449* (2013.01); *B60N 2/503* (2013.01); *B60N 2/686* (2013.01); *B60N 2/70* (2013.01); *B60N 2/7005* (2013.01)

(58) Field of Classification Search
CPC ........................ B60N 2/2222; B60N 2205/30
USPC ................... 297/284.1, 284.3, 284.9, 452.34, 297/452.36
See application file for complete search history.

(56) References Cited

U.S. PATENT DOCUMENTS 2,958,369 A 11/1960 Pitts et al.
3,403,938 A 10/1968 Cramer et al.
(Continued)

FOREIGN PATENT DOCUMENTS

EP 0754590 1/1997
EP 0926969 1/2002
(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.
(Continued)

*Primary Examiner* — Matthew Ing
(74) *Attorney, Agent, or Firm* — Vichit Chea; Price Heneveld LLP

(57) ABSTRACT

A vehicle seat suspension system includes first and second side supports that define a seatback frame. A front trim piece is coupled between the first and second side supports. A suspension component is coupled with a central area of the front trim piece and has flexible members protruding forward and outward therefrom. A passenger support panel has a periphery coupled to distal ends of the flexible members and suspended away from the seatback frame.

20 Claims, 24 Drawing Sheets

(51) Int. Cl.
*B60N 2/68* (2006.01)
*B60N 2/50* (2006.01)
*B60N 2/70* (2006.01)
*B60N 2/02* (2006.01)
*B60N 2/22* (2006.01)
*B60N 2/44* (2006.01)

(56) References Cited

U.S. PATENT DOCUMENTS

| | | |
|---|---|---|
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,541,669 A | 9/1985 | Goldner |
| 4,629,248 A | 12/1986 | Mawbey |
| 4,720,141 A | 1/1988 | Sakamoto et al. |
| 4,915,447 A | 4/1990 | Shovar |
| 5,171,062 A | 12/1992 | Courtois |
| 5,174,526 A | 12/1992 | Kanigowski |
| 5,518,294 A | 5/1996 | Ligon, Sr. et al. |
| 5,560,681 A | 10/1996 | Dixon et al. |
| 5,647,635 A | 7/1997 | Aumond et al. |
| 5,755,493 A | 5/1998 | Kodaverdian |
| 5,769,489 A | 6/1998 | Dellanno |
| 5,826,938 A | 10/1998 | Yanase et al. |
| 5,836,648 A | 11/1998 | Karschin et al. |
| 5,902,014 A | 5/1999 | Dinkel et al. |
| 5,913,568 A | 6/1999 | Brightbill et al. |
| 5,951,039 A | 9/1999 | Severinski et al. |
| 6,024,406 A | 2/2000 | Charras et al. |
| 6,062,642 A | 5/2000 | Sinnhuber et al. |
| 6,145,925 A | 11/2000 | Eksin et al. |
| 6,155,593 A | 12/2000 | Kimura et al. |
| 6,179,379 B1 | 1/2001 | Andersson |
| 6,189,966 B1 | 2/2001 | Faust et al. |
| 6,196,627 B1 | 3/2001 | Faust et al. |
| 6,206,466 B1 | 3/2001 | Komatsu |
| 6,217,062 B1 | 4/2001 | Breyvogel et al. |
| 6,220,661 B1 | 4/2001 | Peterson |
| 6,224,150 B1 | 5/2001 | Eksin et al. |
| 6,296,308 B1 | 10/2001 | Cosentino et al. |
| 6,312,050 B1 | 11/2001 | Eklind |
| 6,364,414 B1 | 4/2002 | Specht |
| 6,375,269 B1 | 4/2002 | Maeda et al. |
| 6,394,546 B1 | 5/2002 | Knoblock et al. |
| 6,454,353 B1 | 9/2002 | Knaus |
| 6,523,892 B1 | 2/2003 | Kage et al. |
| 6,550,856 B1 | 4/2003 | Ganser et al. |
| 6,565,150 B2 | 5/2003 | Fischer et al. |
| 6,619,605 B2 | 9/2003 | Lambert |
| 6,682,140 B2 | 1/2004 | Minuth et al. |
| 6,695,406 B2 | 2/2004 | Plant |
| 6,698,832 B2 | 3/2004 | Boudinot |
| 6,736,452 B2 | 5/2004 | Aoki et al. |
| 6,758,522 B2 | 7/2004 | Ligon, Sr. et al. |
| 6,808,230 B2 | 10/2004 | Buss et al. |
| 6,824,212 B2 | 11/2004 | Malsch et al. |
| 6,848,742 B1 | 2/2005 | Aoki et al. |
| 6,860,559 B2 | 3/2005 | Schuster, Sr. et al. |
| 6,860,564 B2 | 3/2005 | Reed et al. |
| 6,866,339 B2 | 3/2005 | Itoh |
| 6,869,140 B2 | 3/2005 | White et al. |
| 6,890,029 B2 | 5/2005 | Svantesson |
| 6,938,953 B2 | 9/2005 | Håland et al. |
| 6,955,399 B2 | 10/2005 | Hong |
| 6,962,392 B2 | 11/2005 | O'Connor |
| 6,988,770 B2 | 1/2006 | Witchie |
| 6,997,473 B2 | 2/2006 | Tanase et al. |
| 7,040,699 B2 | 5/2006 | Curran et al. |
| 7,100,992 B2 | 9/2006 | Bargheer et al. |
| 7,131,694 B1 | 11/2006 | Buffa |
| 7,159,934 B2 | 1/2007 | Farquhar et al. |
| 7,185,950 B2 | 3/2007 | Pettersson et al. |
| 7,213,876 B2 | 5/2007 | Stoewe |
| 7,229,118 B2 | 6/2007 | Saberan et al. |
| 7,261,371 B2 | 8/2007 | Thunissen et al. |
| 7,344,189 B2 | 3/2008 | Reed et al. |
| 7,350,859 B2 | 4/2008 | Klukowski |
| 7,393,005 B2 | 7/2008 | Inazu et al. |
| 7,425,034 B2 | 9/2008 | Bajic et al. |
| 7,441,838 B2 | 10/2008 | Patwardhan |
| 7,467,823 B2 | 12/2008 | Hartwich |
| 7,478,869 B2 | 1/2009 | Lazanja et al. |
| 7,481,489 B2 | 1/2009 | Demick |
| 7,506,924 B2 | 3/2009 | Bargheer et al. |
| 7,506,938 B2 | 3/2009 | Brennan et al. |
| 7,530,633 B2 | 5/2009 | Yokota et al. |
| 7,543,888 B2 | 6/2009 | Kuno |
| 7,578,552 B2 | 8/2009 | Bajic et al. |
| 7,597,398 B2 | 10/2009 | Lindsay |
| 7,614,693 B2 | 11/2009 | Ito |
| 7,641,281 B2 | 1/2010 | Grimm |
| 7,669,925 B2 | 3/2010 | Beck et al. |
| 7,669,928 B2 | 3/2010 | Snyder |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,602 B2 | 8/2010 | Lazanja et al. |
| 7,784,863 B2 | 8/2010 | Fallen |
| 7,802,843 B2 | 9/2010 | Andersson et al. |
| 7,819,470 B2 | 10/2010 | Humer et al. |
| 7,823,971 B2 | 11/2010 | Humer et al. |
| 7,845,729 B2 | 12/2010 | Yamada et al. |
| 7,857,381 B2 | 12/2010 | Humer et al. |
| 7,871,126 B2 | 1/2011 | Becker et al. |
| 7,891,701 B2 | 2/2011 | Tracht et al. |
| 7,909,360 B2 | 3/2011 | Marriott et al. |
| 7,931,294 B2 | 4/2011 | Okada et al. |
| 7,931,330 B2 | 4/2011 | Itou et al. |
| 7,946,649 B2 | 5/2011 | Galbreath et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,075,053 B2 | 12/2011 | Tracht et al. |
| 8,109,569 B2 | 2/2012 | Mitchell |
| 8,123,246 B2 | 2/2012 | Gilbert et al. |
| 8,128,167 B2 | 3/2012 | Zhong et al. |
| 8,162,391 B2 | 4/2012 | Lazanja et al. |
| 8,162,397 B2 | 4/2012 | Booth et al. |
| 8,167,370 B2 | 5/2012 | Arakawa et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,165 B2 | 7/2012 | Mizoi |
| 8,342,607 B2 | 1/2013 | Hofmann et al. |
| 2004/0195870 A1 | 10/2004 | Bohlender et al. |
| 2005/0200166 A1 | 9/2005 | Noh |
| 2006/0043777 A1 | 3/2006 | Friedman et al. |
| 2007/0120401 A1 | 5/2007 | Minuth et al. |
| 2008/0067850 A1* | 3/2008 | Stenstrom ............ B60N 2/062 297/353 |
| 2008/0174159 A1 | 7/2008 | Kojima et al. |
| 2009/0066122 A1 | 3/2009 | Minuth et al. |
| 2009/0165263 A1 | 7/2009 | Smith |
| 2009/0322124 A1 | 12/2009 | Barkow et al. |
| 2010/0026066 A1* | 2/2010 | Graber ............... B60N 2/2222 297/284.1 |
| 2010/0038937 A1 | 2/2010 | Andersson et al. |
| 2010/0140986 A1 | 6/2010 | Sawada |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0231013 A1 | 9/2010 | Schlenker |
| 2010/0270840 A1 | 10/2010 | Tanaka et al. |

(56) References Cited

U.S. PATENT DOCUMENTS

| | | | |
|---|---|---|---|
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |
| 2011/0095513 A1 | 4/2011 | Tracht et al. | |
| 2011/0095578 A1 | 4/2011 | Festag | |
| 2011/0109127 A1 | 5/2011 | Park et al. | |
| 2011/0109128 A1 | 5/2011 | Axakov et al. | |
| 2011/0121624 A1* | 5/2011 | Brncick | B60N 2/0232 297/284.2 |
| 2011/0133525 A1 | 6/2011 | Oota | |
| 2011/0163574 A1 | 7/2011 | Tame et al. | |
| 2011/0163583 A1 | 7/2011 | Zhong et al. | |
| 2011/0186560 A1 | 8/2011 | Kennedy et al. | |
| 2011/0187174 A1 | 8/2011 | Tscherbner | |
| 2011/0254335 A1 | 10/2011 | Pradier et al. | |
| 2011/0260506 A1 | 10/2011 | Kuno | |
| 2011/0272548 A1 | 11/2011 | Rudkowski et al. | |
| 2011/0272978 A1 | 11/2011 | Nitsuma | |
| 2011/0278885 A1 | 11/2011 | Procter et al. | |
| 2011/0278886 A1 | 11/2011 | Nitsuma | |
| 2011/0298261 A1 | 12/2011 | Holt et al. | |
| 2012/0032486 A1 | 2/2012 | Baker et al. | |
| 2012/0037754 A1 | 2/2012 | Kladde | |
| 2012/0063081 A1 | 3/2012 | Grunwald | |
| 2012/0080914 A1 | 4/2012 | Wang | |
| 2012/0091695 A1 | 4/2012 | Richez et al. | |
| 2012/0091766 A1 | 4/2012 | Yamaki et al. | |
| 2012/0091779 A1 | 4/2012 | Chang et al. | |
| 2012/0109468 A1 | 5/2012 | Baumann et al. | |
| 2012/0119551 A1 | 5/2012 | Brncick et al. | |
| 2012/0125959 A1 | 5/2012 | Kucera | |
| 2012/0127643 A1 | 5/2012 | Mitchell | |
| 2012/0129440 A1 | 5/2012 | Kitaguchi et al. | |
| 2012/0162891 A1 | 6/2012 | Tranchina et al. | |
| 2012/0175924 A1 | 7/2012 | Festag et al. | |
| 2012/0187729 A1 | 7/2012 | Fukawatase et al. | |
| 2012/0248833 A1 | 10/2012 | Hontz et al. | |
| 2012/0261974 A1 | 10/2012 | Yoshizawa et al. | |
| 2013/0076092 A1 | 3/2013 | Kulkarni et al. | |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

"Thigh Support for Tall Drivers," http://cars.about.com/od/infiniti/ig/2009-Infiniti-G37-Coupe-pics/2008-G37-cpe-thigh-support.htm (1 page), 2013.

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/41691 (2 pages).

Brose India Automotive Systems, "Adaptive Sensor Controlled Headrest," http://www.indiamart.com/broseindiaautomotivesystems/products.html, Oct. 9, 2012 (12 pages).

ecoustics.com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Imola Pro-fit", Cobra, (http://cobra.subesports.com/products/cat/seats/brand/Cobra/prodID/656), Date unknown, 2 pages.

* cited by examiner

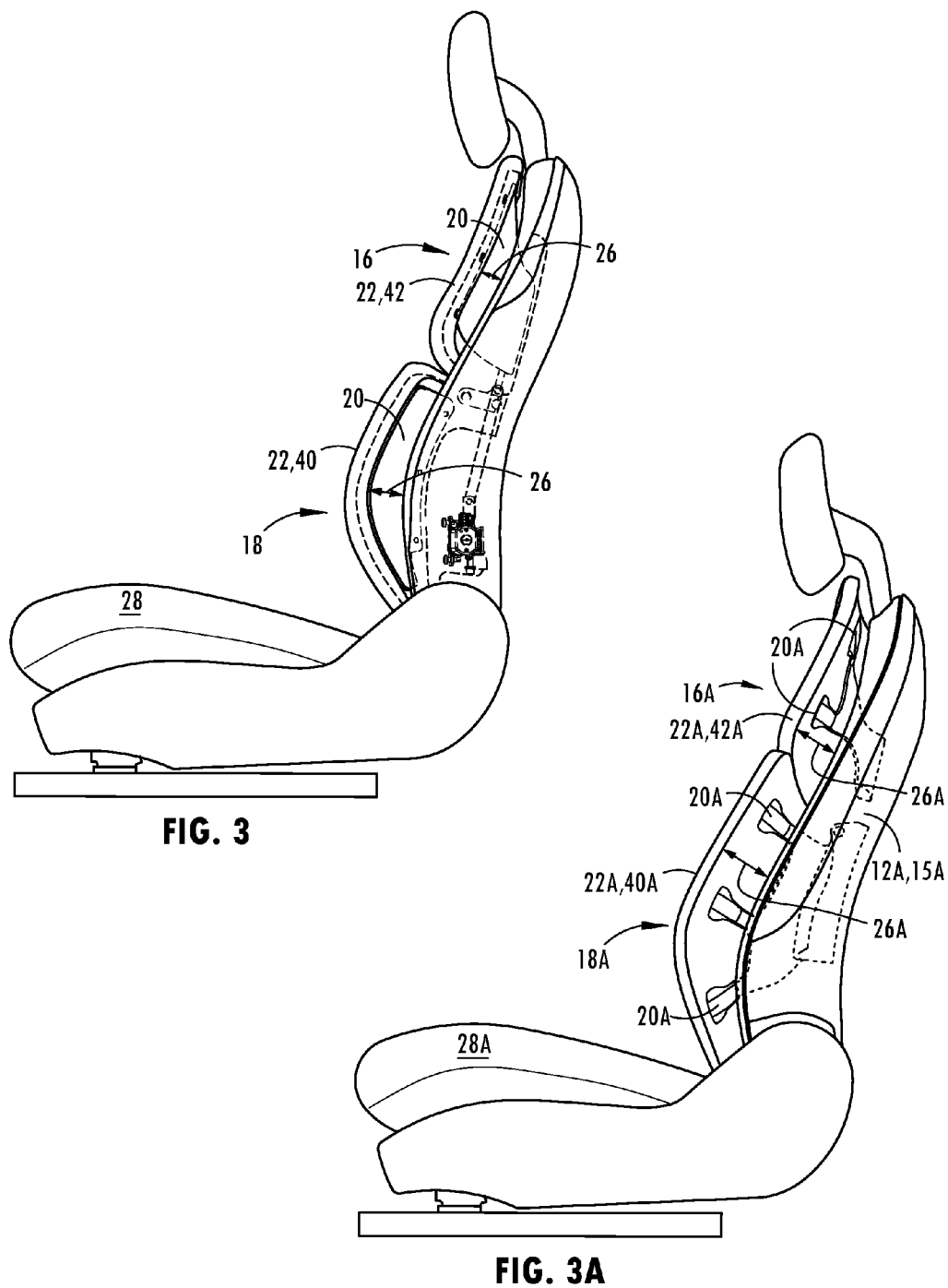

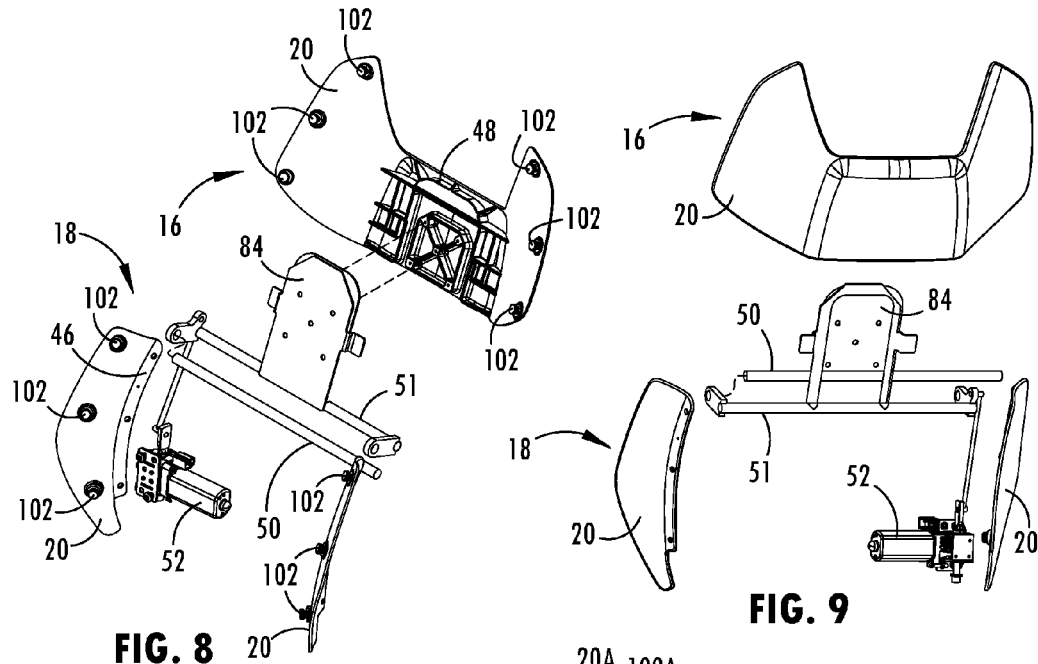
FIG. 8
FIG. 9
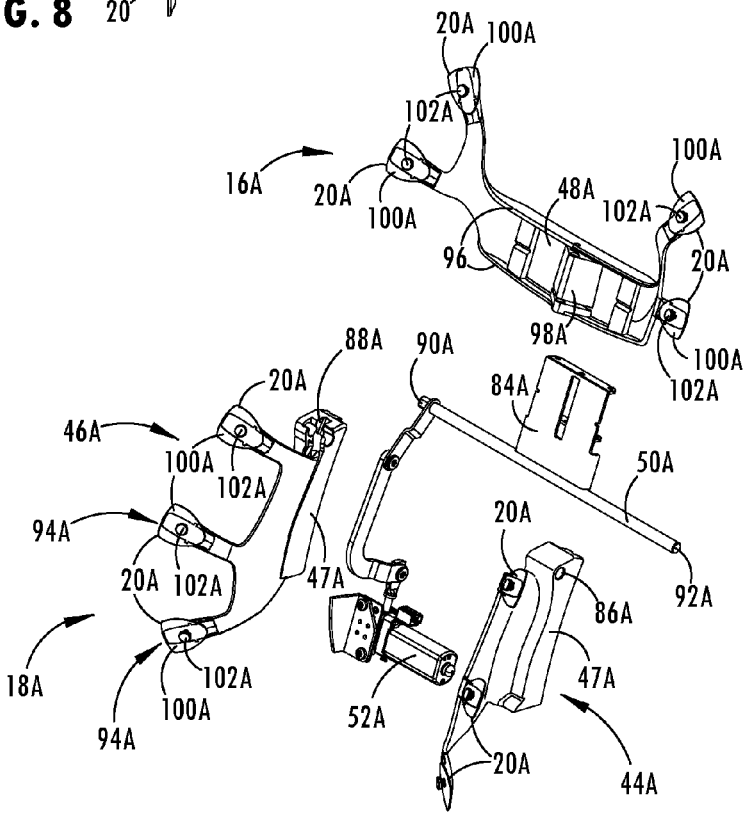
FIG. 8A

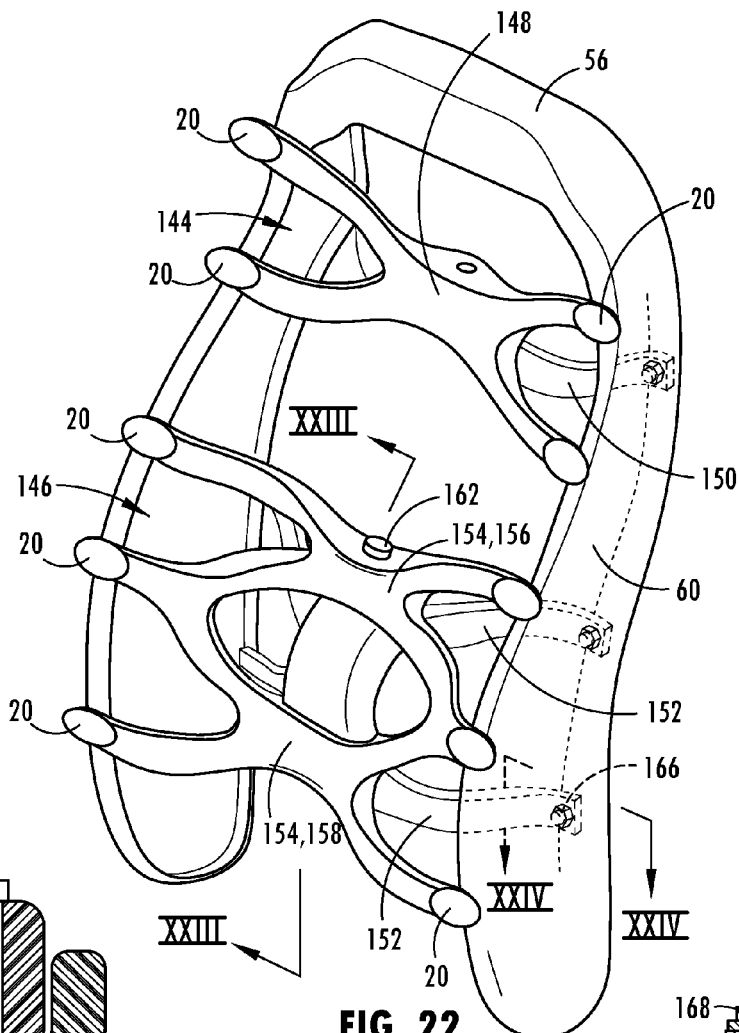
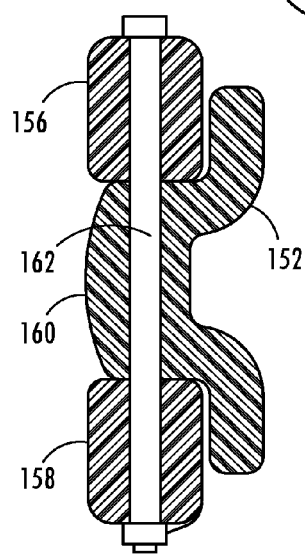
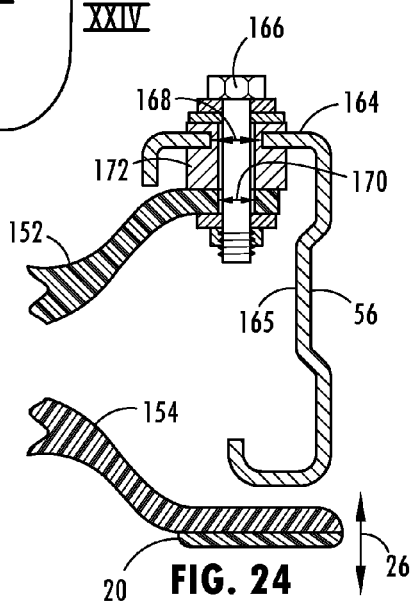
FIG. 22
FIG. 23
FIG. 24

FLEXIBLE SEATBACK SYSTEM

CROSS-REFERENCE TO RELATED APPLICATION

This application is a continuation-in-part of U.S. patent application Ser. No. 13/749,561, filed on Jan. 24, 2013, entitled "FLEXIBLE SEATBACK SYSTEM." The aforementioned related application is hereby incorporated by reference.

FIELD OF THE INVENTION

The present invention generally relates to a vehicle seat suspension system, and more particularly to a vehicle seating assembly with a flexible seatback suspension system.

BACKGROUND OF THE INVENTION

Vehicle seat assemblies typically include a seatback to support a back of an occupant in an upright sitting position and various reclined positions. Similar to other portions of a vehicle seating assembly, seatbacks are commonly designed to support an occupant in the upright sitting position upon acceleration, change in direction, and collision of the vehicle. Accordingly, seatbacks are substantially rigid and sizeable in construction.

SUMMARY OF THE INVENTION

According to one aspect of the present invention, a vehicle seat suspension system includes first and second side supports that define a seatback frame. A front trim piece is coupled between the first and second side supports. A suspension component is coupled with a central area of the front trim piece and has flexible members protruding forward and outward therefrom. A passenger support panel has a periphery coupled to distal ends of the flexible members and suspended away from the seatback frame.

According to another aspect of the present invention, a vehicle seating assembly includes a seatback frame and a trim piece spanning between front edges of side supports of the seatback frame. An upper-back suspension component is coupled with the trim piece centrally between the side supports and has flexible members protruding forward. A passenger support panel has lateral portions coupled to the flexible members and spaced from the seatback frame for resiliently moving rearward upon deflection of the suspension component.

According to yet another aspect of the present invention, a seat suspension system includes a trim piece coupled between side supports of a seatback frame. A suspension component is coupled with the trim piece and has flexible members protruding forward and outward therefrom. A passenger support panel has a periphery coupled to distal ends of the flexible members, spaced forward from the seatback frame, and flexible rearward upon resilient deflection of the suspension component.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a side elevation view of the vehicle seating assembly shown in FIG. 2;

FIG. 3A is a side elevation view of the additional embodiment of the vehicle seating assembly shown in FIG. 2A;

FIG. 8 is an exploded front perspective view of the suspension system shown in FIG. 5;

FIG. 8A is an exploded front perspective view of the additional embodiment of the suspension system shown in FIG. 5A;

FIG. 9 is an exploded rear perspective view of the suspension system shown in FIG. 5;

FIG. 22 is a top perspective view of an additional embodiment of a vehicle seating assembly;

FIG. 23 is a side elevation cross-sectional view of the suspension system taken at line XVII of FIG. 22;

FIG. 24 is a top plan cross-sectional view of the suspension system taken at line XVIII of FIG. 22;

DETAILED DESCRIPTION OF THE EMBODIMENTS

Figures 1, 2:
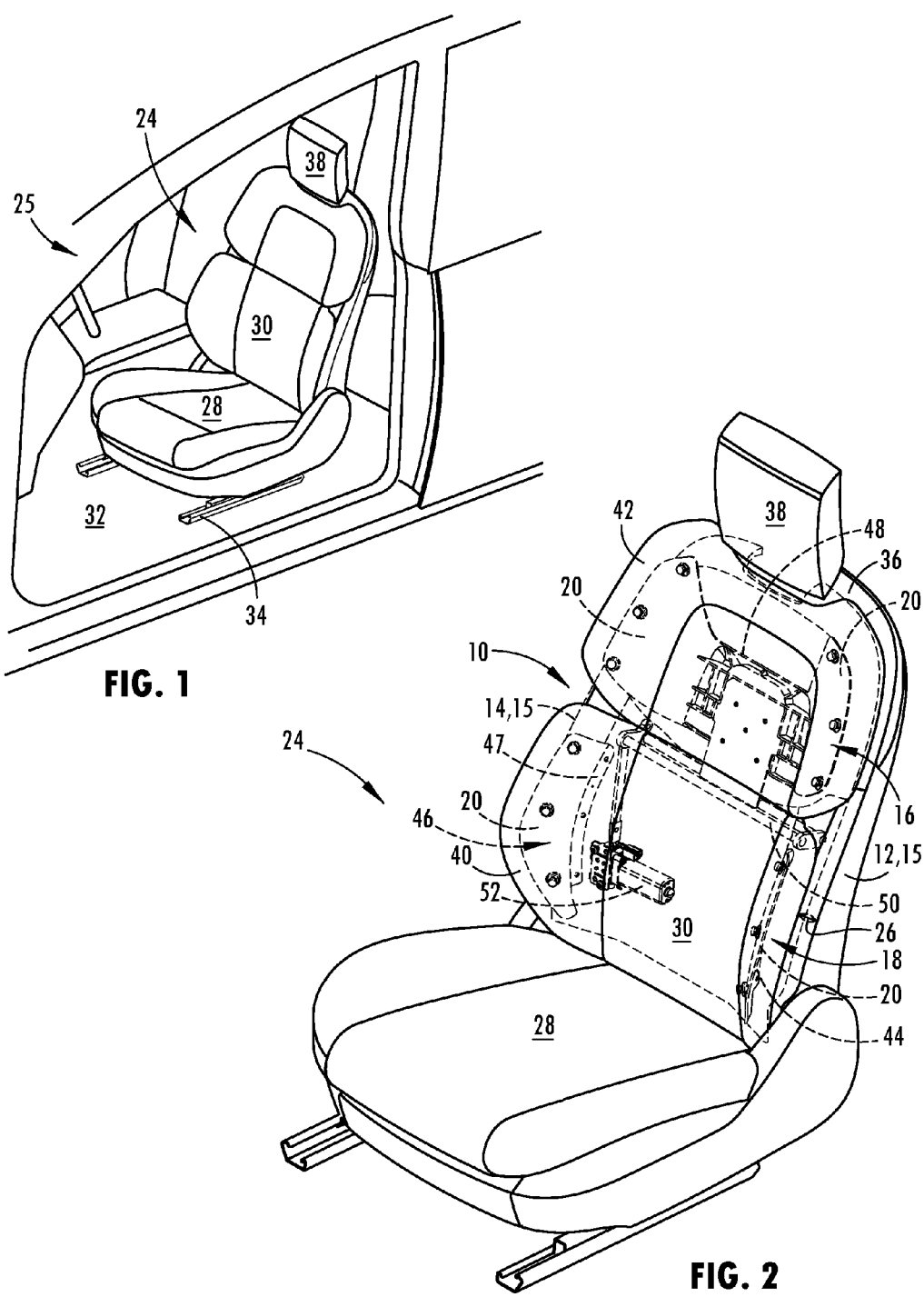
FIG. 1 is a top perspective view of a vehicle seating assembly in a vehicle.
FIG. 2 is a top perspective view of the vehicle seating assembly having a vehicle seat suspension system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-35, reference numeral 10 generally designates a vehicle seat suspension system that has a first side support 12 and a second side support 14 defining a seatback frame 15. An upper-back suspension component 16 and a lower-back suspension component 18 each include at least two outwardly extending flexible members 20. A passenger support 22 includes a periphery 23 operably coupled to distal ends of the flexible members 20. An external peripheral gap 26 is defined between the passenger support 22 and the seatback frame 15.

Referring now to FIG. 1, a vehicle seating assembly 24 is positioned in driver's side lactation of a vehicle 25. The vehicle seating assembly 24 includes a seat 28 pivotally coupled with a seatback 30. The seat 28 is slidably coupled with a floor 32 of the vehicle 25 about a track assembly 34. The track assembly 34 is configured to allow the vehicle seating assembly 24 to be adjusted in forward and rearward directions relative to the vehicle 25. It is understood that the vehicle seating assembly 24 may be positioned at various locations throughout the vehicle 25 other than the illustrated position, such as, a passenger side location, a mid-row location, and a rear seat location. It is also conceivable that the seat 28 may not include the track assembly 34 and alternatively may be fixedly coupled with the floor 32 of the vehicle 25.

As illustrated in FIG. 2, the vehicle seating assembly 24 contains the vehicle seat suspension system 10 of the present disclosure. As such, the seatback 30 of the seating assembly 24 includes the first side support 12 and the second side support 14 that define the seatback frame 15. The first and second side supports 12, 14 of the seatback frame 15 pivotally couple with a rear portion of the seat 28 and extend upward from the seat 28 to a top portion 36 of the seatback 30. The top portion 36 of the seatback 30 extends between the first and second side supports 12, 14. A head restraint 38 is coupled with the top portion 36 of the seatback 30 and is substantially centered between the first and second side supports 12, 14. The upper-back and lower-back suspension components 16, 18 of the suspension system 10 are coupled with and span between the first and second side supports 12, 14, such that the suspension system 10 is positioned generally between the head restraint 38 and the seat 28 to support an occupant's back. It is contemplated that the head restraint 38 may be integrated with the top portion 36 of the seatback 30 or that the head restraint 38 may otherwise not be included on the vehicle seating assembly 24.

The lower-back suspension component 18 of the suspension system 10, as shown in FIG. 2, includes a flexible member 20 extending from each of the first side support 12 and the second side support 14 to engage a lower segment 40 of the passenger support 22. The lower segment 40 is positioned adjacent to the seat 28 and is configured to support a lower back of an occupant. Similarly, the upper-back suspension component 16 of the suspension system 10 has a pair of flexible members 20 extending to engage an upper segment 42 of the passenger support 22 proximate the first and second side supports 12, 14. The flexible members 20 of the upper-back suspension component 16 extend from a central body 48 that is pivotally coupled with the first and second side supports 12, 14. Accordingly, the upper-back and lower-back suspension components 16, 18 each include at least two outwardly extending flexible members 20. However, it is conceivable that the upper-back and lower-back suspension components 16, 18 may be integrated in a single suspension component spanning the seatback 30 or divided further into additional suspension components along the seatback 30.

Still referring to FIG. 2, the lower-back suspension component 18 also includes a first side portion 44 and a second side portion 46, such that the first side portion 44 is distinct and separate from the second side portion 46. The first side portion 44 and the second side portion 46 each include a base section 47 coupled with the first and second side supports 12, 14, respectively. The first and second side portions 44, 46 also include a flexible member 20 that extends from the base section 47 to operably couple with the lower segment 40 of the passenger support 22. Accordingly, the first and second side portions 44, 46 of the lower-back suspension component 18 are each independently coupled with the seatback frame 15 and independently extend to operably couple with the lower segment 40 of the passenger support 22.

The upper-back suspension component 16 of the suspension system 10, as shown in FIG. 2, includes a pair of flexible member 20 extending from both sides of the central body 48 to operably couple with the upper segment 42 of the passenger support 22. The upper segment 42 is positioned between the lower segment 40 of the passenger support 22 and the head restraint 38 to support an upper back of an occupant. In the embodiment illustrated in FIG. 2, the central body 48 of the upper-back suspension component 16 is coupled with a pivot bar 50 that laterally extends between the first and second side supports 12, 14 of the seat frame 15. The pivot bar 50 is pivotally coupled to allow the upper-back suspension component 16 to pivot forward and rearward about the pivot bar 50. Further, the pivot bar 50 is operably coupled with a motor 52 to adjustably rotate the pivot bar 50 and thereby pivot the upper-back suspension component 16 forward and rearward relative to seat frame 15, as described in more detail below.

Figure 2A:
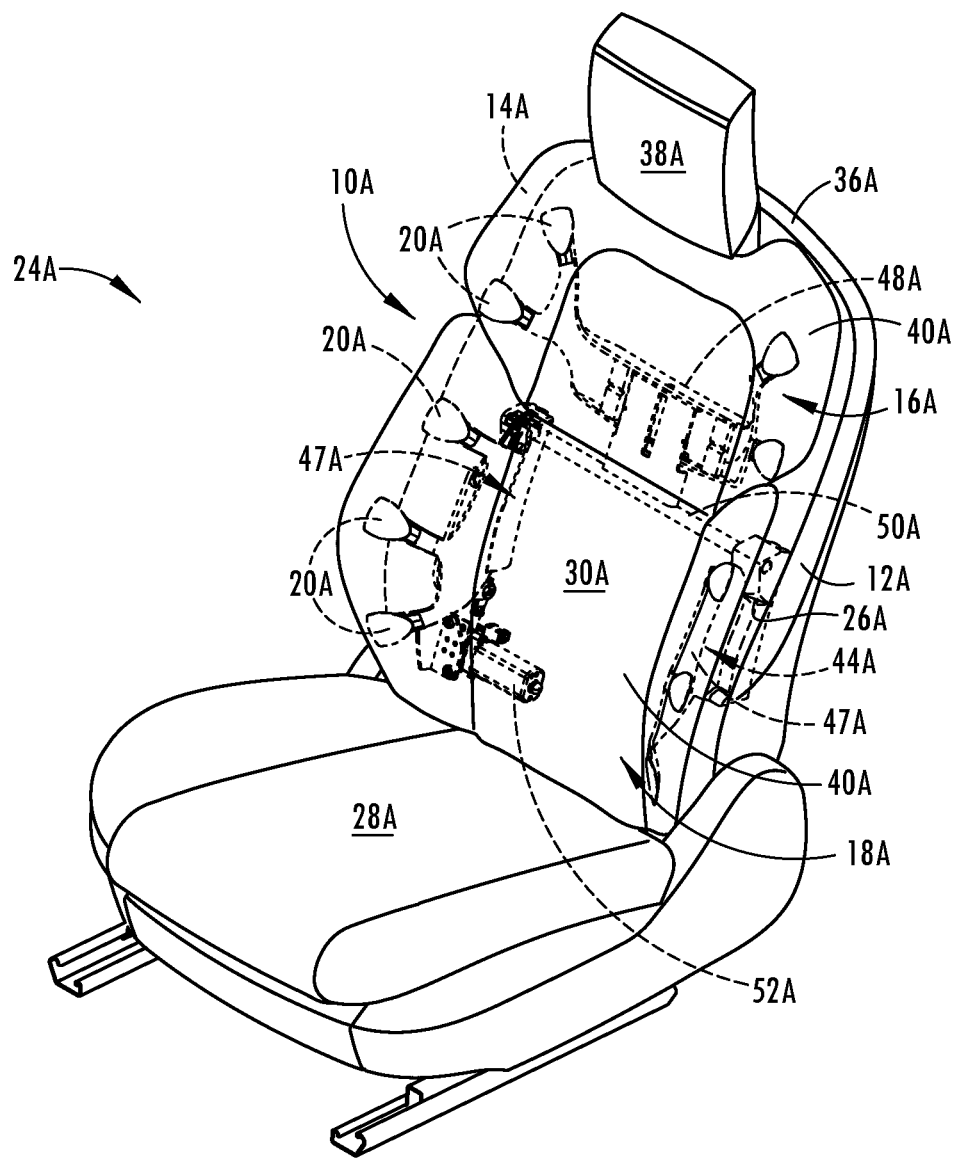
FIG. 2A is a top perspective view of an additional embodiment of the vehicle seating assembly and vehicle seat suspension system.

An additional embodiment of the vehicle seating assembly is illustrated in FIG. 2A and other figures denoted with an "A" suffix, illustrating similar components with like reference numerals that also include an "A" suffix. As shown in FIG. 2A, a lower component 18A of the vehicle suspension system 10A includes three flexible members 20A extending from the first side support 12A, and three flexible members 20A extending from the second side support 14A. These flexible members 20A have a finger shape that similarly engage the lower segment 40A of the passenger support 22A. The base sections 47A of the first and second side portions 44A, 46A spans along the first and second side supports 12A, 14A, respectively to interconnect the finger shaped flexible members 20A. This additional embodiment also includes an upper-back suspension component 16A having two, finger shaped flexible members 20A extending from both sides of a central body 48A to operably couple to an upper segment 42A of the passenger support 20A, proximate the first and second side supports 12A, 14A. In addition the upper and lower segments 42A, 40A of the passenger support 22A include alternative shapes from those disclosed in FIG. 2, to similarly support the upper and lower back of an occupant. It is further contemplated that an alternative embodiment may include more, fewer, or alternatively shaped flexible members extending on either side of an upper-back and a lower-back upper-back suspension component to engage a passenger support.

Figure 4:
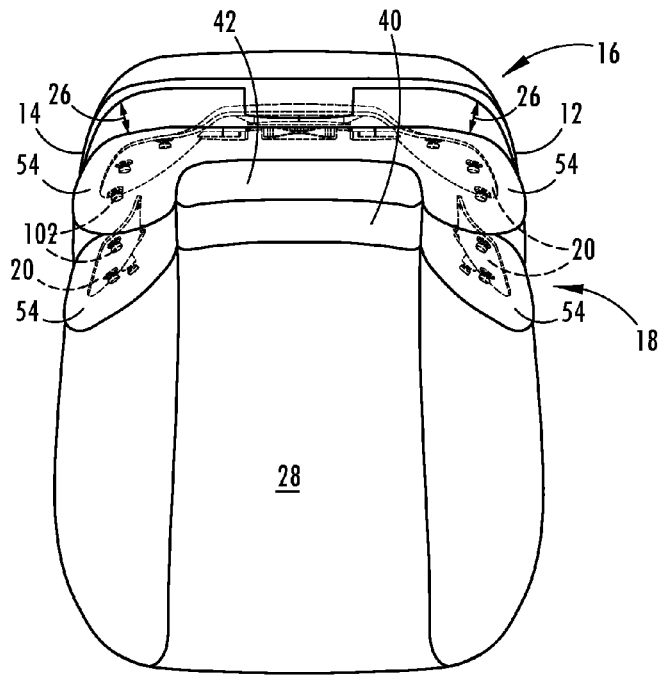
FIG. 4 is a top plan view of the vehicle seating assembly shown in FIG. 2.

As illustrated in FIGS. 3-4, the flexible members 20 of the upper-back and lower-back suspension components 16, 18 extend forward from the seatback frame 15 to form the external peripheral gap 26 between the seatback frame 15 and the passenger support 22. The external peripheral gap 26 may be reduced in size proximate a force acting on the passenger support 22, compressing one or more flexible members 20 supporting the passenger support 22. As such, the upper-back suspension component 16 and the lower-back suspension component 18 are independently flexible under the weight of an occupant, as described in more detail below. As shown in FIG. 4, the flexible members 20 of the upper-back and lower-back upper-back suspension components 16, 18 also extend forward and laterally outward to operably couple with angled side bolsters 54 of the passenger support 22. The angled side bolsters 54 are configured to prevent lateral movement of a back of an occupant relative to the passenger support 22, such as lateral movement of an occupant's back when experiencing a centrifugal force from turning the vehicle 25.

Figure 4A:
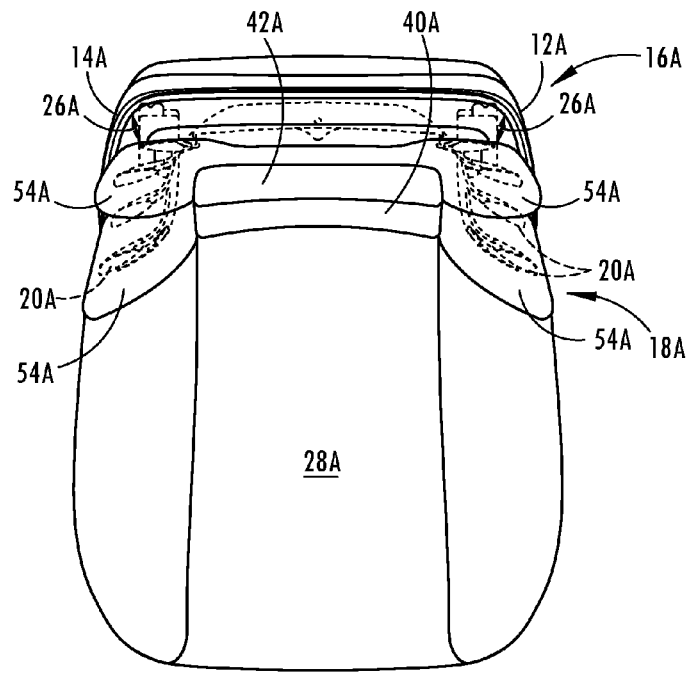
FIG. 4A is a top plan view of the additional embodiment of the vehicle seating assembly shown in FIG. 2A.

Further, as shown in FIGS. 3A-4A, the additional embodiment of the seating assembly 24A has alternatively configured flexible members 20A that similarly form an external peripheral gap 26A between the passenger support 22A and the seatback frame 15A. Also, the additional embodiment, as illustrated in FIG. 4A, includes angled side bolsters 54A of the passenger support 22A. However, it is conceivable that the seatback 30A may be configured without angled side bolsters 54A. It is also contemplated that the external peripheral gap 26A may be concealed by a cover stock material, a flexible shroud, or other conceivable barriers to visually conceal and/or to conceal from insertion of objects.

Figure 5:
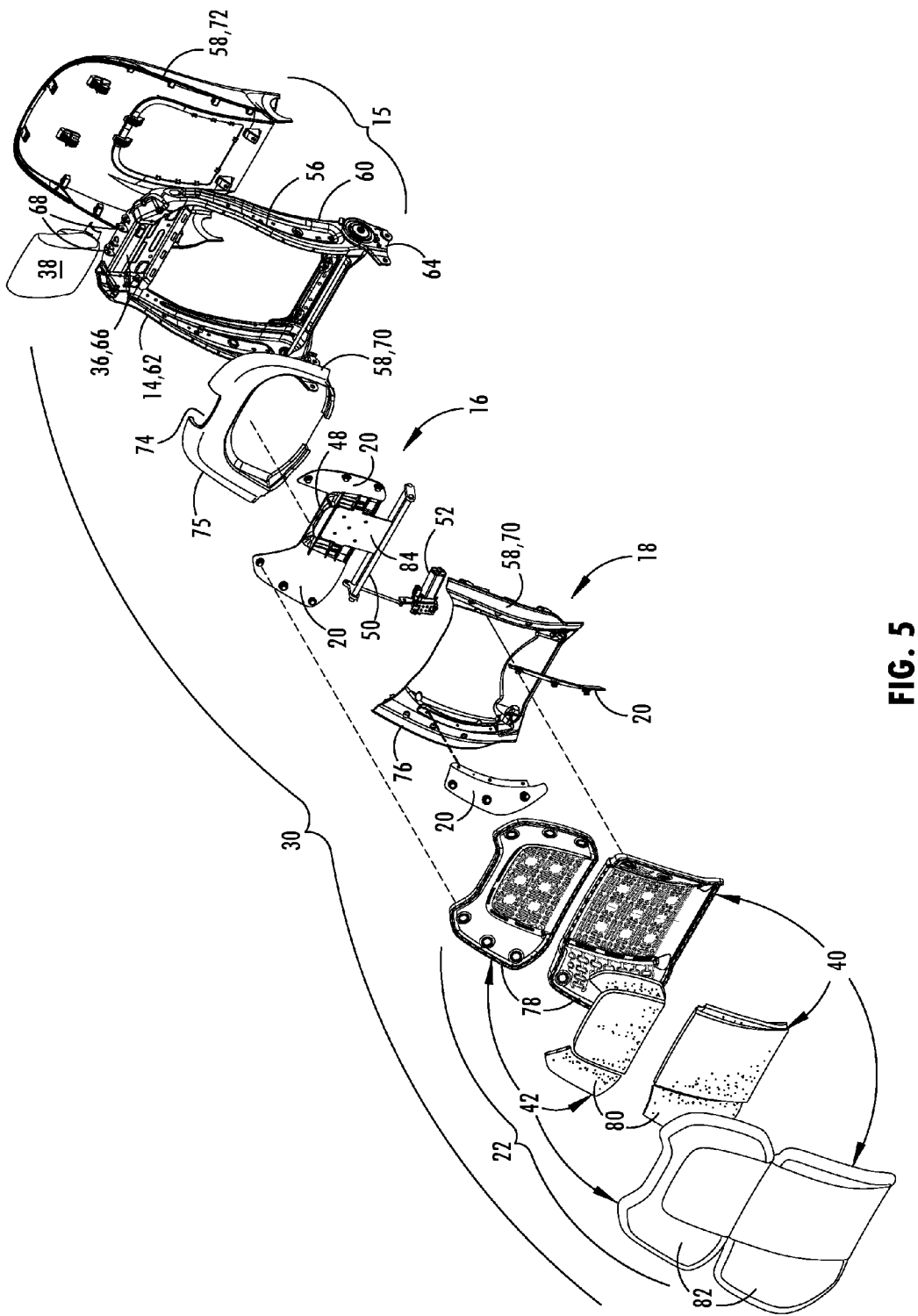
FIG. 5 is an exploded top perspective view of a seatback of the vehicle seating assembly shown in FIG. 2, having the suspension system and a passenger support.

The seatback frame 15, as shown in FIG. 5, includes a metal structure 56 and a plastic trim shell 58 configured to substantially enclose the metal structure 56. The metal structure 56 has a first side member 60 and a second side member 62 extending upward from a recliner bracket 64 that pivotally couples with the seat 28 (FIG. 2). The first and second side members 60, 62 are substantially parallel with each other and curve upward and rearward from the recliner bracket 64 to provide a curved shape that is substantially similar to an occupant's spinal column. Further, the side members 60, 62 are more robust proximate the recliner bracket 64 and taper as they extend upward to couple with a top member 66 that extends orthogonally between the first and second side members 60, 62. Accordingly, the first and second side supports 12, 14 of the seatback frame 15 include the first and second side members 60, 62, respectively, and the top portion 36 of the seatback frame 15 includes the top member 66 of the metal structure 56. The top member 66 includes connectors 68 for securing the head restraint 38 at a central portion of the top member 66 centrally between the first and second side members 60, 62. The connectors 68 include upward protruding tabs configured to couple with the head restraint 38.

As also shown in FIG. 5, plastic trim shell 58 includes a back trim panel 72 and a front trim panel 74. The back trim panel 72 couples with the metal structure 56 to substantially enclose the rear portion of the seat frame 15. Similarly, the front trim panel 74 has an upper piece 75 and a lower piece 76 that each couple with the metal structure 56 to enclose the front portion of the seat frame 15. The lower piece 76 of the front trim panel 70 couples with the flexible members 20 of the lower-back suspension component 18, and as such, supports the lower segment 40 of the passenger support 22. The upper piece 75 of the front trim panel 70 couples with the lower piece 76 at a central area of the seatback 30. The upper pieces 75 also includes a mounting cutaway 74 for receiving the head restraint 38 that extends therethrough to couple with the top member 66 of the metal structure 56. Further, the upper-back suspension component 16 is positioned forward the upper piece, as explained in more detail below. The front trim panel 70 and the back trim panel 72 also engage the metal structure 56 proximate the top member 66, the first side member 60, and the second side member 62, substantially enclosing the edge portion of the metal structure 56. The shell 58 is typically molded with a polymer material and the structure 56 is constructed substantially of steel, aluminum, or another substantially rigid metal. It is conceivable that alternative materials or forming methods may be used for the shell 58 and the structure 56. In addition, the shell 58, or portions thereof, may conceivably be integrated with the structure 56.

Still referring to FIG. 5, the upper-back and lower-back suspension components 16, 18 of the suspension system 10 are configured to operably couple with the passenger support 22. More specifically, the flexible members 20 on the upper-back and lower-back suspension components 16, 18 extend forward to engage the upper and lower segments 42, 40 of the passenger support 22. The upper and lower segments 42, 40 include a trim carrier 78, a cushion 80, and a cover stock 82. The flexible members 20 operably couple to the trim carrier 78 in a snap-fit and friction-fit arrangement. The cushion 80 is disposed between the trim carrier 78 and the cover stock 82, as described in more detail below. It is conceivable that the passenger support 22 may include more or fewer layers between the cover stock 82 and the trim carrier 78. Further, it is conceivable that the upper and lower segments 42, 40 of the passenger support 22 may be an integral piece with each other and/or with the upper-back and lower-back suspension components 16, 18 of the suspension system 10

Figure 5A:
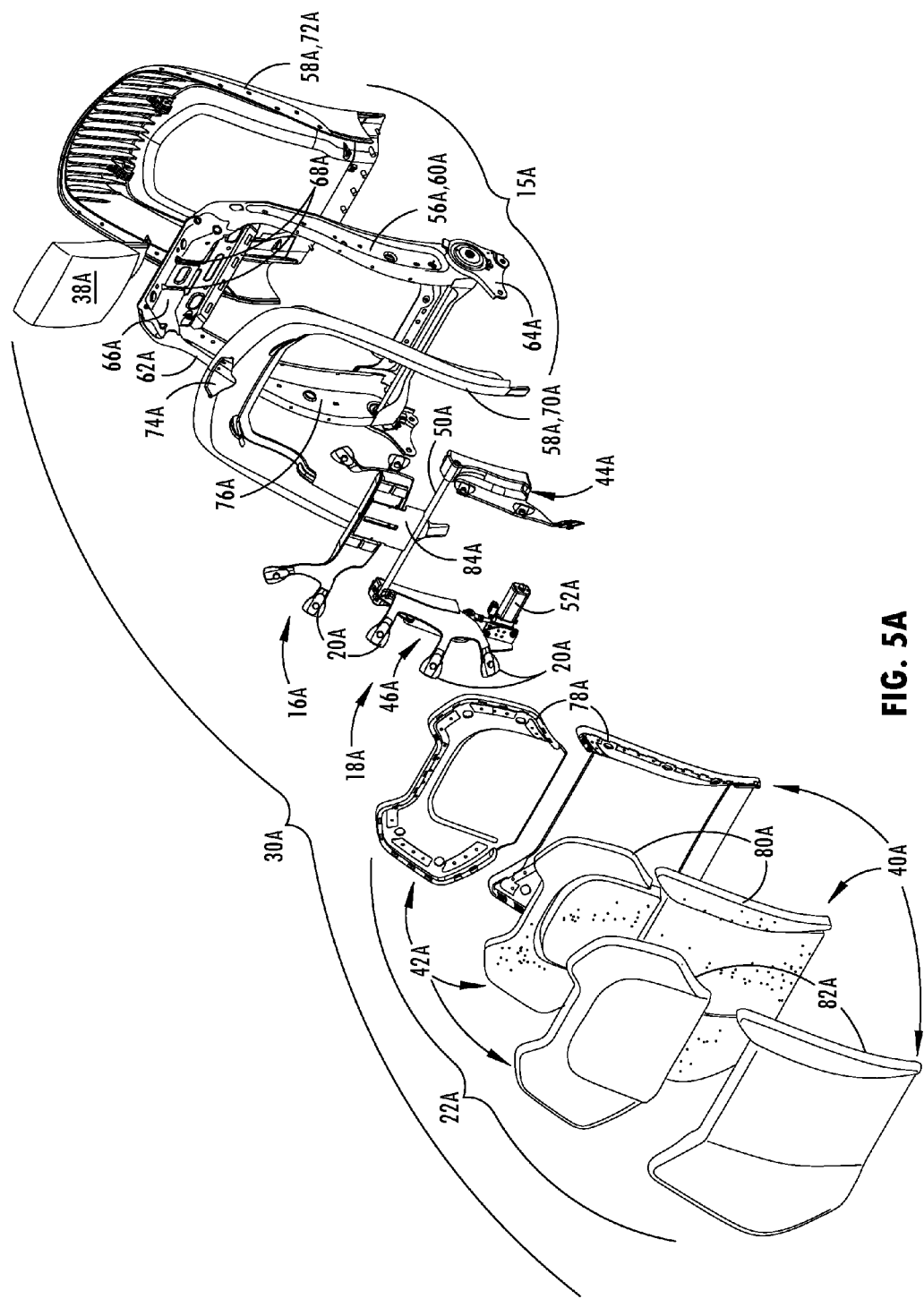
FIG. 5A is an exploded top perspective view of a seatback the additional embodiment of the vehicle seating assembly shown in FIG. 2A, having the suspension system a passenger support.

In the additional embodiment illustrated in FIG. 5A, the front trim panel 70A is comprised of one piece having an inverted U-shape that does not include a portion spanning between a central portion of the first and second side members 60A, 62A of the metal structure 56A. Accordingly, in the embodiment shown in FIG. 5A, flexible members 20A of the lower-back suspension component 18A extend around the front trim panel 70A to directly coupled with the first and second side members 60A, 62A of the metal structure 56A. In addition, the connectors 68A that are configured to couple with the head restraint 38A include fastener apertures. It is conceivable that a variety of connectors 68A may be used to couple the head restraint 38A with the seatback 30A.

Figures 6, 7:
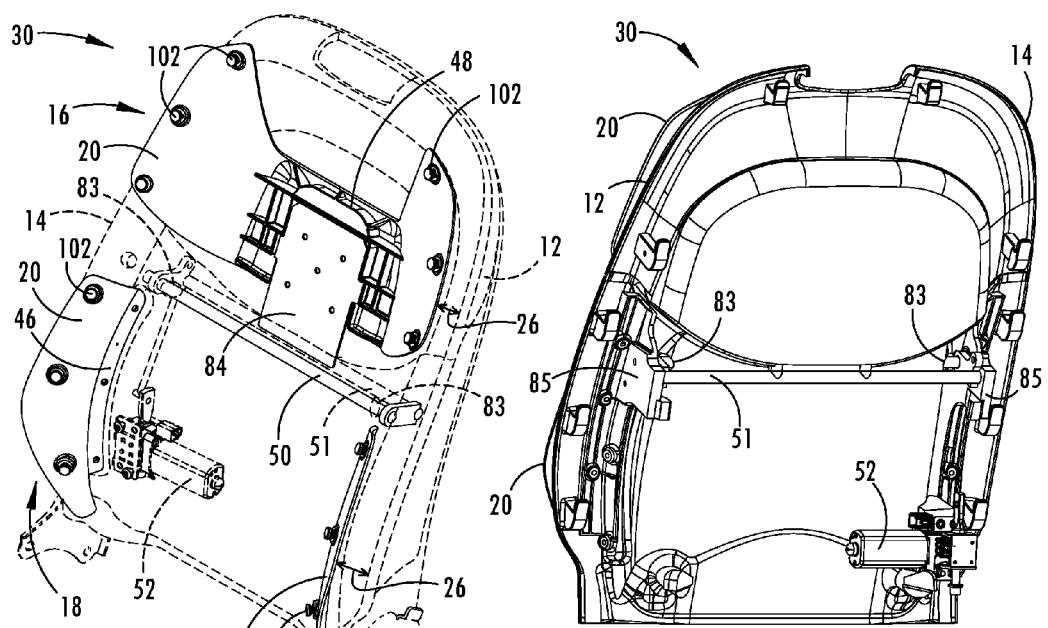
FIG. 6 is a front perspective view of the seatback and the suspension system shown in FIG. 5.
FIG. 7 is a rear perspective view of the seatback and the suspension system shown in FIG. 5.
Figure 6A:
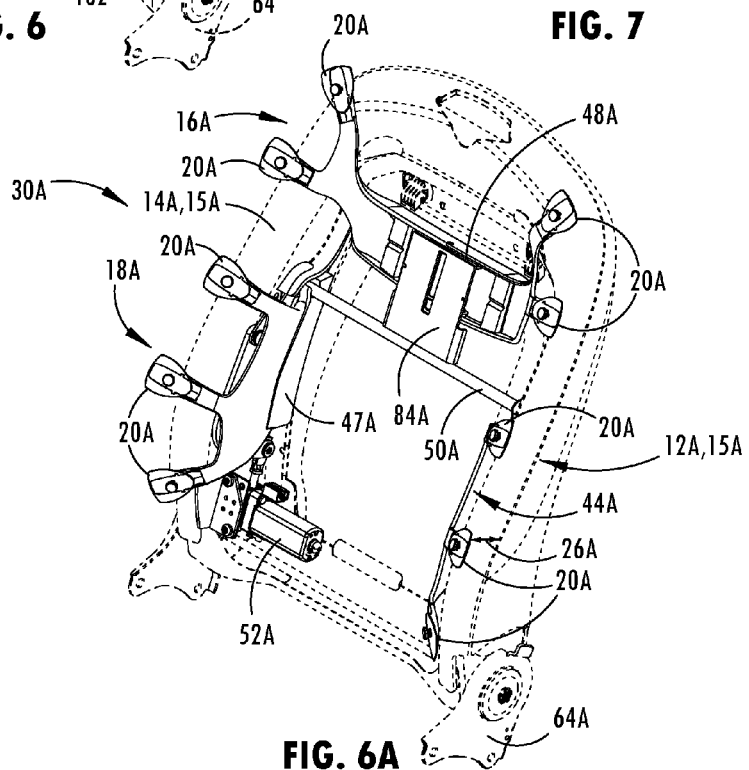
FIG. 6A is a front perspective view of the additional embodiment of the seatback shown in FIG. 5A.

Referring now to FIGS. 6-7, the first and second side portions 44, 46, of the lower component 18 each include a flexible member 20 that extends from the elongated base portion 47. The elongated base portions 47 each include three apertures arranged longitudinally and in alignment with the first and second side supports 12, 14 for fastening the first and second side portions 44, 46 of the lower-back suspension component 18 to the lower piece 76 of the front trim panel 70. The flexible members 20 of the lower-back suspension component 18 extend forward and outward from the base portions 47 to create the external peripheral gap 26. The pivot bar 50 spans between and pivotally couples with the first and second side supports 12, 14, generally above the lower-back suspension component 18. More specifically, the pivot bar 50 extends through holes 83 in the lower piece 76 of the front trim panel 70 to rotatably couple with a rearward protruding bracket 85 from the front trim panel 70. A support bar 51 extends in substantially parallel alignment rearward the pivot bar 50 and couples with the end portions of the pivot bar 50. The pivot bar 50 is operably coupled with the motor 52 to pivotally adjust the pivot bar 50, which also rotates the support bar 51. An extension bracket 84 fixedly couples and protrudes upward from an intermediate portion of the support bar 51 to a location forward the upper piece 75 of the front trim panel 70. The extension bracket 84 supports the upper-back suspension component 16 of the suspension system 10. As such, pivotally adjusting the pivot bar 50 in turn adjusts the upper-back suspension component 16 forward and rearward to support the upper back of an occupant.

In the additional embodiment shown in FIG. 7A, the elongated base portions 47A of the lower-back suspension component 18A directly engage an interior face of the first and second side members 60A, 62A of the metal structure 56A. The flexible members 20A similarly extend forward and curve outward from base portions 47A to create the peripheral gap 26A. In this embodiment, the pivot bar 50 rotatably couples with and extends between the base portions 47A. An extension bracket 84A fixedly couples and protrudes upward from an intermediate portion of the pivot bar 50A to support and pivotally adjust the upper-back suspension component 16A of the suspension system 10. It is conceivable that the upper-back suspension component 16A may be coupled with the first and second side supports 12A, 14A, of the seatback frame 15A without a pivot bar 50A or other pivoting connection.

As illustrated in FIGS. 8-9, the extension bracket 84 couples with the central body 48 of the upper-back suspension component 16. The central body 48 of the upper-back suspension component 16 is substantially rectangular shaped and includes structural flanges 96 between the extension bracket 84 and the flexible members 20 to provide structural support to central body 48. The flexible members 20 on the upper-back suspension component 16 fan upward and outward from structural flanges 96 of the central body 48 to provide support to the upper back and shoulders of an occupant, such that weight of an occupant against the upper segment 42 of the passenger support 22 (FIG. 5) causes the flexible members 20 to bend rearward proximate the occupants applied weight. However, the structural flanges 96 and other portion of the central body 48 are substantially rigid relative to the flexible members 20, such that the bending movement is directed proximate the flexible members 20.

The additional embodiment, as illustrated in FIG. 8A, includes a fulcrum 98A disposed at the middle portion of the central body 48A of the upper-back suspension component 16A and extends between structural flanges 96A disposed on a top edge and a bottom edge of the central body 48. The fulcrum 98A is adapted to engage the extension bracket 84A that protrudes upward from the pivot bar 50A to allow the central body 48A to pivot laterally about the fulcrum 98A. Accordingly, in addition to the rearward bending movement of the flexible members 20A of the upper-back suspension component 16A under the weight of an occupant, the upper-back suspension component 16A also pivots laterally about the fulcrum 98 to accommodate movement of an occupant's upper back and shoulders. Further, the additional embodiment includes a keyed end 90A on the pivot bar 50A to engage a slot 88A in the base portion 47A of the lower-back suspension component 18A. The pivot bar 50A also has a circular end 92A to engage a rotation aperture 86A in the base portion 47A of the opposing side of the lower-back suspension component 18A. The keyed end 90A of the pivot bar 50A allows the pivot bar 50A to be installed after the first and second side portions 44A, 46A are coupled with the metal structure 56A. In such an additional embodiment, the elongated base portions 47A have a substantially rectangular prism shape.

As also shown on the embodiment illustrated in FIG. 8A, the flexible members 20A have distal ends 94A that each include a paddle portion 100A to engage the passenger support 22 (FIG. 5A). The paddle portions 100A have a protrusion 102A to engage the passenger support 22A in a snap-fit arrangement. As such, the flexible members 20A of this embodiment are configured to bend between the paddle portions 100A and the base portions 47A, allowing the flexible members 20A to elastically deform under the weight of an occupant. It is conceivable that the flexible members 20A may be alternatively shaped to provide greater or less rigidity to the passenger support 22A. In addition, it is contemplated that the finger portions of the flexible members 20A may be individually detachable from the base portion 47A of the lower component 18A or the central body 48A of the upper-back suspension component 16A to allow for replacement and/or customized rigidity to the passenger support 22A proximate the detachable finger portion.

Figure 10:
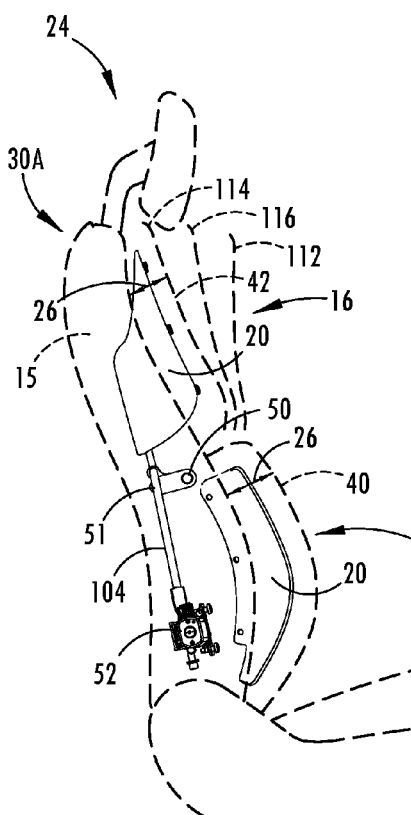
FIG. 10 is a side elevation view of the suspension system shown in FIG. 5, showing an outline of the vehicle seating assembly in dashed lines.

As illustrated in FIG. 10, the upper-back suspension component 16 is pivotable forward and rearward about the pivot bar 50. The motor 52 is operably coupled with the pivot bar 50 to rotatably adjust support bar 51 and the upper segment 42 of the passenger support 22 forward and rearward relative to the lower segment 40. A linkage 104 couples the motor 52 with an end portion of the pivot bar 50. The linkage 104 may conceivably include a direct gear connection between motor 52 and the pivot bar 50. The upper-back suspension component 16 is pivotal between a forward position 112, a rearward position 114, and various intermediate positions 116 there between. The upper-back suspension component 16 in the rearward position 114 is defined by the upper segment 42 of the passenger support 22 substantially aligned with the seatback frame 15, as also shown in FIGS. 1-4. As the upper-back suspension component 16 moves to the intermediate positions 116 and further to the forward position 112, the upper segment 42 of the passenger support 22 tilts forward to provide additional support to the upper back of an occupant. Accordingly, the external peripheral gap 26 expands proximate the upper-back suspension component 16 as the upper segment 42 of the passenger support 22 pivots forward to the forward position 112. It is contemplated that the seating assembly 24 may be configured to optionally pivot the upper-back suspension component 16 from the rearward position 114 to the intermediate positions 116 and further to forward position 112 simultaneously as the seatback 30 reclines from an upright position, as illustrated in FIG. 10, to a reclined position relative to the seat 28, as generally understood in the art.

Figure 10A:
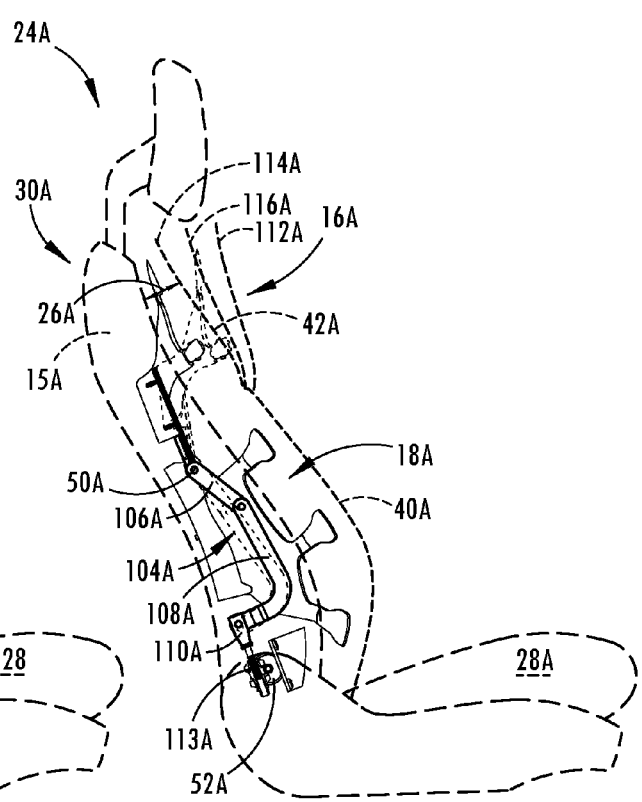
FIG. 10A is a side elevation view of the additional embodiment of the suspension system shown in FIG. 5A, showing an outline of the vehicle seating assembly in dashed lines.

As shown in FIG. 10A, the additional embodiment includes linkage assembly 104A coupling the keyed end 90A of the pivot bar 50A with the motor 52A to allow the upper segment 40A of the passenger support 22A to pivot about the pivot bar 50A. Such a linkage assembly 104A includes a top link 106A that is fixedly coupled with the pivot bar 50A and that extends down and forward from the pivot bar 50A. An L-shaped bottom link 108A pivotally couples with the top link 106A at an upper end of the bottom link 108A and pivotably couples with a pin 110A at a lower end of the bottom link 108A. The pin 110A is threaded to engage a worm gear 113A operably coupled with the motor 52A. The motor 52A operates to drive the pin 110A up or down based upon the rotational direction of the motor 52A. It is conceivable that the motor 52A may be replaced with a manually rotatable knob to cause the upper-back suspension component 16A to pivot about the pivot bar 50A. Further, it is conceivable that various linkage alternative arrangements or other means, such as a Bowden cable, may be used to rotate the pivot bar 50A and pivot the upper-back suspension component 16A.

Figures 11, 12:
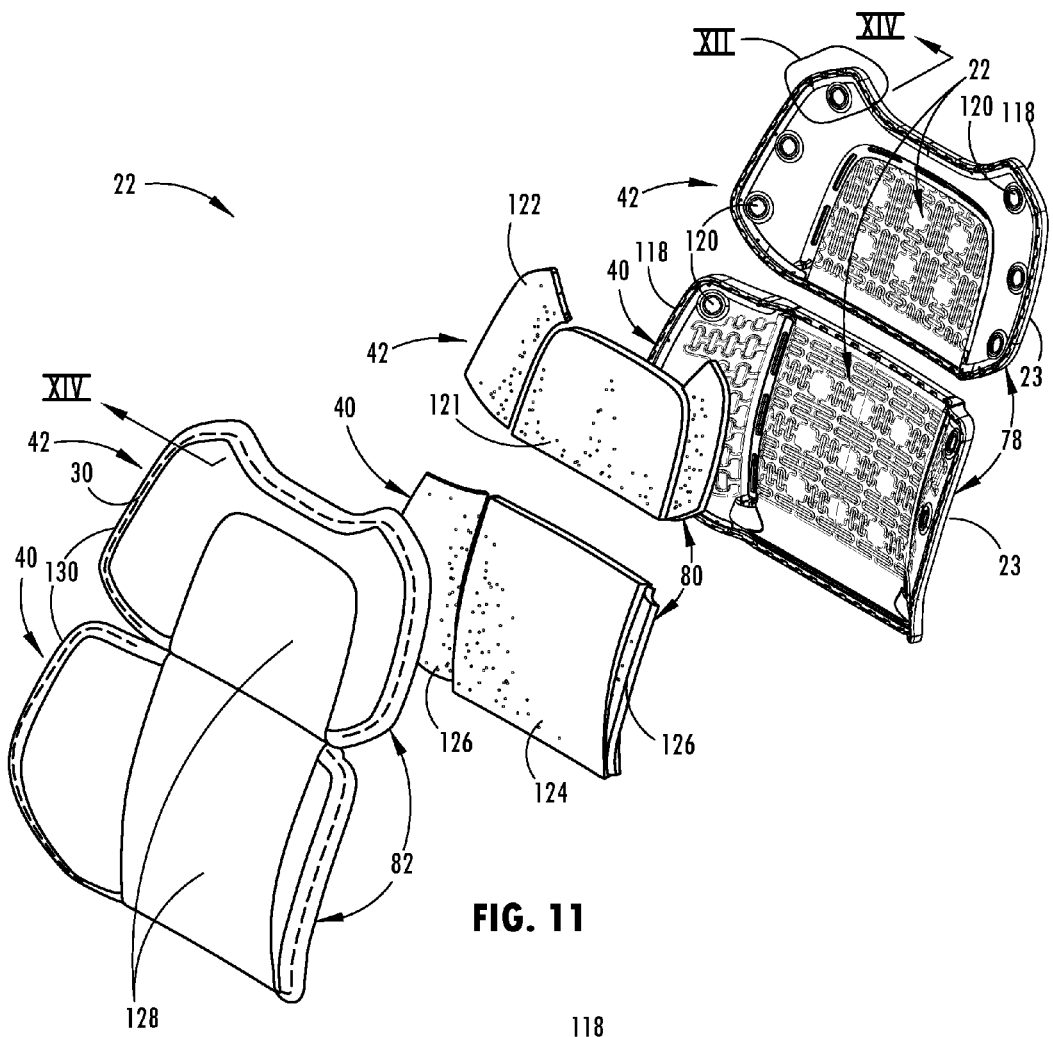
FIG. 11 is an exploded top perspective view of the passenger support shown in FIG. 5.
FIG. 12 is a enlarged cutaway view of a periphery of the passenger support taken at line XII of FIG. 11.

Referring to FIG. 11, the upper and lower segments 42, 40 of the passenger support 22 include the trim carrier 78, the cushion 80, and the cover stock 82. The trim carrier 78 has a substantially polymer-based structure that is formed to the contour of an occupant's back and is flexible to elastically deform somewhat under the weight of an occupant in conjunction with other portions of the suspension system 10, as provided in more detail below. Further, the passenger support 22 has the periphery 23 that operably couples to the flexible members 20. More specifically, the periphery 23 of trim carrier 78 of the passenger support 22, as shown in FIG. 12, includes an outer edge 118 and a plurality of connection holes 120. The plurality of connection holes 120 are positioned to engage the protrusions 102 on the flexible members 20 (FIG. 8) in a snap-fit arrangement. The trim carrier 78 is shown having two substantially solid molded plastic panels, one for each of the upper and lower segments 42, 40 of the passenger support. However, it is conceivable that the upper and lower segments 42, 40 may be a single piece with a living hinge disposed there between to allow for pivotal movement of the upper-back suspension component 16. The trim carrier 78 also includes openings formed in a shape and pattern to increase the flexibility and ventilation of the passenger support 22. It is conceivable that the openings may be formed in an alternative pattern and/or a series of ventilations holes dispersed uniformly or intermittently over portions of the trim carrier 78 for the desired flexibility and ventilation of the passenger support 22.

The cushion 80 of the upper segment 42 of the passenger support, as shown in FIG. 11, has an inner portion 121 and two outer portions 122 laterally positioned on the sides of the inner portion 121 proximate the flexible members 20 of the upper-back suspension component 16 (FIG. 5). The inner and outer portions 121, 122 are disposed over the trim carrier 80 of the upper segment 43. Similarly, the cushion 80 of the lower segment 40 has a central portion 124 and two side portions 126 that are positioned laterally adjacent the central portion 124 and engage the trim carrier 78 of the lower segment 40. The outer edge 118 of the trim carrier 78, as shown in FIG. 12, protrudes forward from an engagement surface that has the plurality of connection holes 120 and that engages the cushion 80. The outer edge 118 laterally retains the outer portions 122 and the side portions 126 of the cushion 80. The outer portions 122 and the side portions 126 of the cushion 80 engage portions of the trim carrier 78 that flair forward to create the angled side bolsters 54 (FIG. 4), as described above. The cushion 80 includes a matrix of woven fibers that have open areas to allow ventilation. However, it is also conceivable that the cushion 80 may include various alternative flexible and breathable materials, such as polyurethane foam or other conceivable materials.

Figure 13:
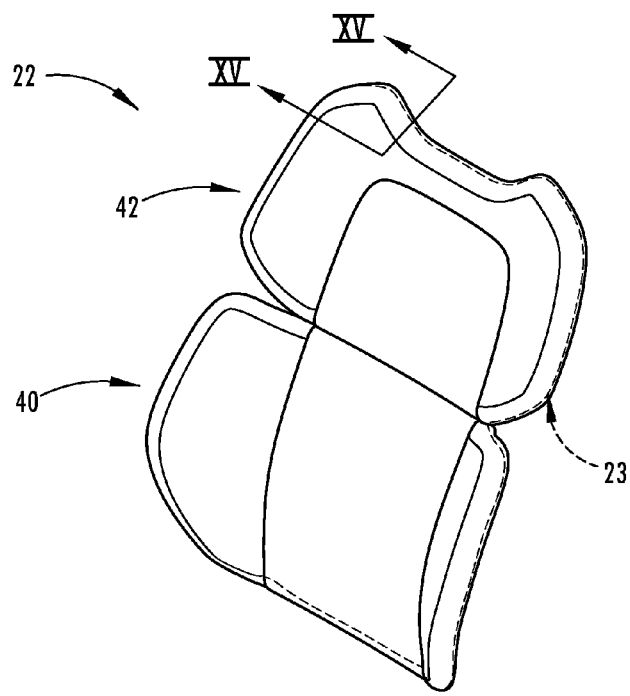
FIG. 13 is a top perspective view of the passenger support shown in FIG. 11.
Figure 14:
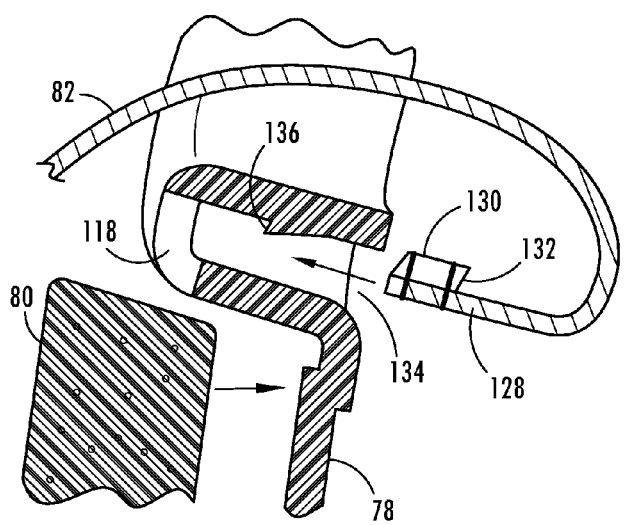
FIG. 14 is a cross-sectional side view of the passenger support taken at line XIV-XIV of FIG. 11, showing the flexible trim being attached to the trim carrier.
Figure 15:
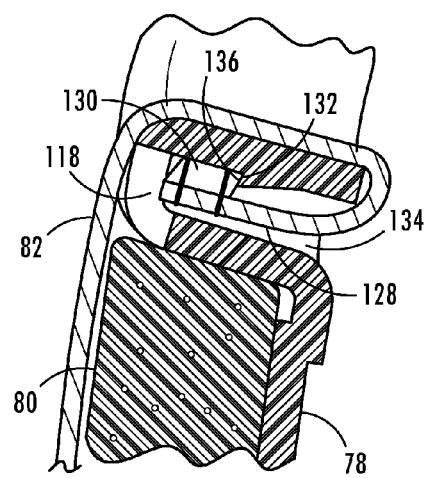
FIG. 15 is a cross-sectional side view of the passenger support taken at line XV-XV of FIG. 13, showing the flexible trim attached to the trim carrier.

As illustrated in FIGS. 13-15, the cover stock 82 of the passenger support 22 includes a securing rim 130 disposed on an edge portion 128 of the cover stock 82 that secures the cover stock 82 to the passenger support 22. The cover stock 82 covers the cushion 78 and wraps around the outer edge 118 of the trim carrier 78 to engage a groove 134 formed in the rear side of the exterior edge 118, as shown in FIG. 14. More specifically, the securing rim 130 includes a retention surface 132 that is configured to engage a lip 136 formed within the groove 134. The retention surface is substantially orthogonal to the cover stock 82 and the lip 136 is, similarly, orthogonal to the groove 134. Accordingly, upon insertion of the securing rim 130 of the cover stock 82 into the groove 134, as shown in FIG. 15, the securing rim 130 slides over the lip 136 and the retention edge 136 of the securing rim engages the lip 136, engaging the cover stock 82 with the trim carrier 78. The cover stock 82 also holds the cushion 80 against the trim carrier 78. The cover stock 82 may be removed by disengaging the securing rim 130 without disassembling other portions of the seating assembly, such that replacement of the cover stock 82 and/or cushion 70 is improved. The securing rim 130 is coupled to the cover stock 82 with a plurality of fasteners 140, shown as stitching. The fasteners 140 may conceivably include staples, rivets, and adhesive, among other conceivable fasteners. It is also conceived that the securing rim 130 may be extruded over the edge portion 128 of the cover stock 82, among other attachment means other than fasteners 140. It is contemplated that the cover stock 82 may also extends over the external peripheral gap 26 (FIG. 3), coupling with the seatback frame 15 to conceal the external peripheral gap 26. The cover stock 28 may conceivably be comprised of fabric, leather, elastic, or any other upholstery materials.

Figure 16:
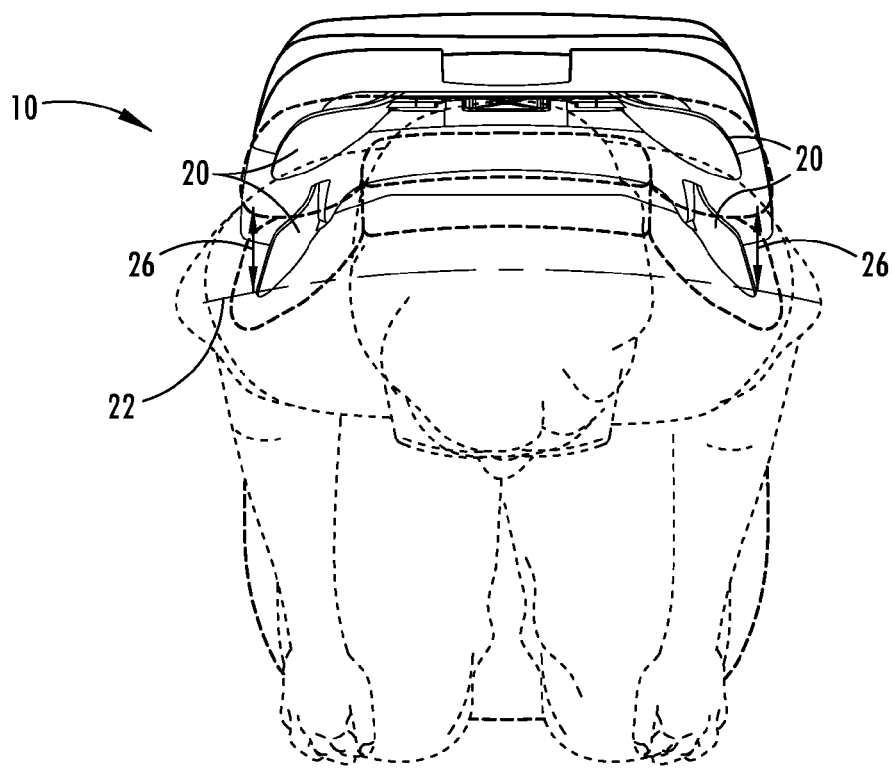
FIG. 16 is a top plan view of the suspension system shown in FIG. 2, having an occupant sitting in the vehicle seating assembly.
Figure 16A:
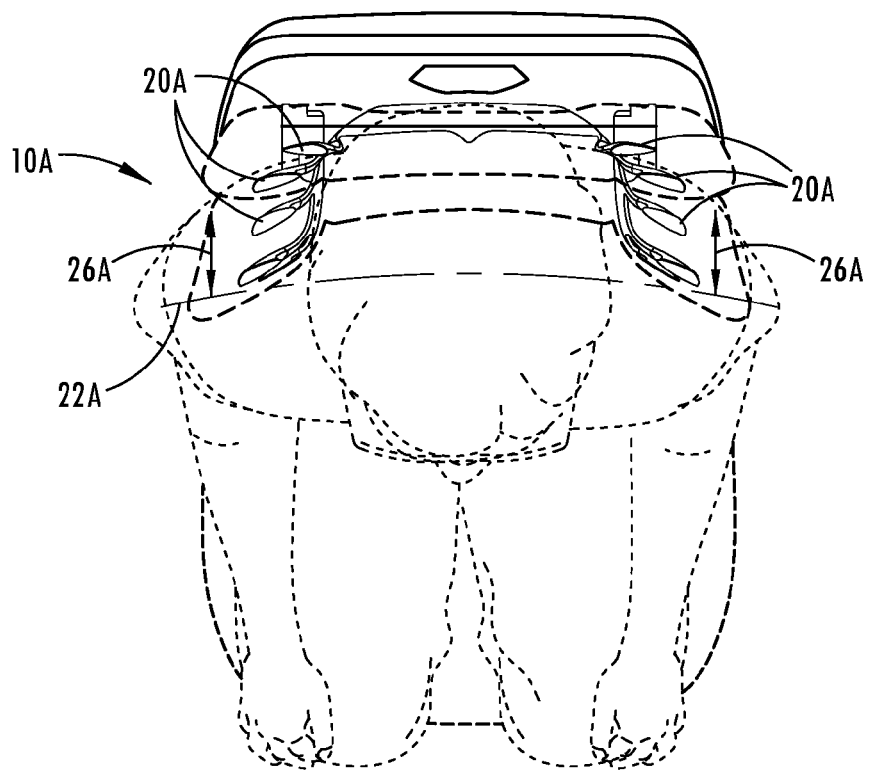
FIG. 16A is a top plan view of the additional embodiment of the suspension system shown in FIG. 2A, having an occupant sitting in the vehicle seating assembly.
Figure 17:
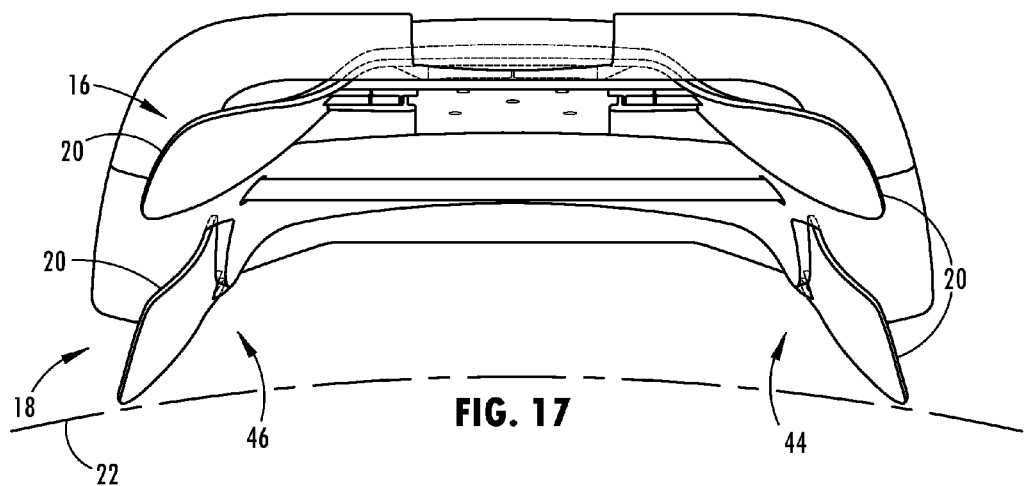
FIG. 17 is a top plan view of the suspension system shown in FIG. 16.
Figure 17A:
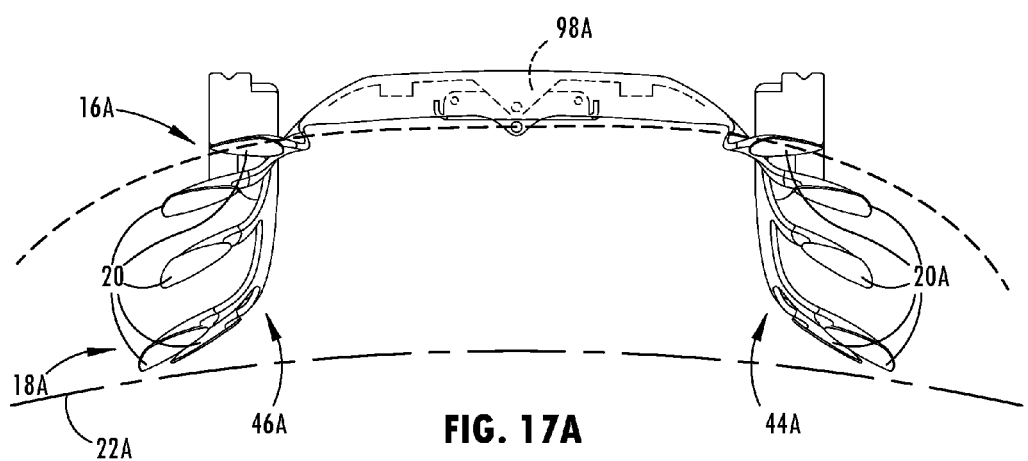
FIG. 17A is a top plan view of the additional embodiment of the suspension system shown in FIG. 16A.

Referring now to FIGS. 16-17, the suspension system 10 is shown with an occupant in an upright sitting position with the occupant's back resting against the passenger support 22 of the seatback 30. In such a position, the occupant is substantially distributing weight evenly to the flexible members 20 on both sides of the suspension system 10. Accordingly, the flexible members 20 of the upper-back suspension component 16 and of the first and second portions 44, 46 of the lower component 18 are equally deformed rearward to absorb the weight of the occupant. As such, the external peripheral gap 26 is substantially equal on either side of the passenger support 22. As shown in FIGS. 16A-17A, the upper-back suspension component 16A of the alternative embodiment is also not laterally pivoted about the fulcrum 98A, similarly maintaining the peripheral gap 26A at a substantially equal size on either side of the passenger support 22A.

Figure 18:
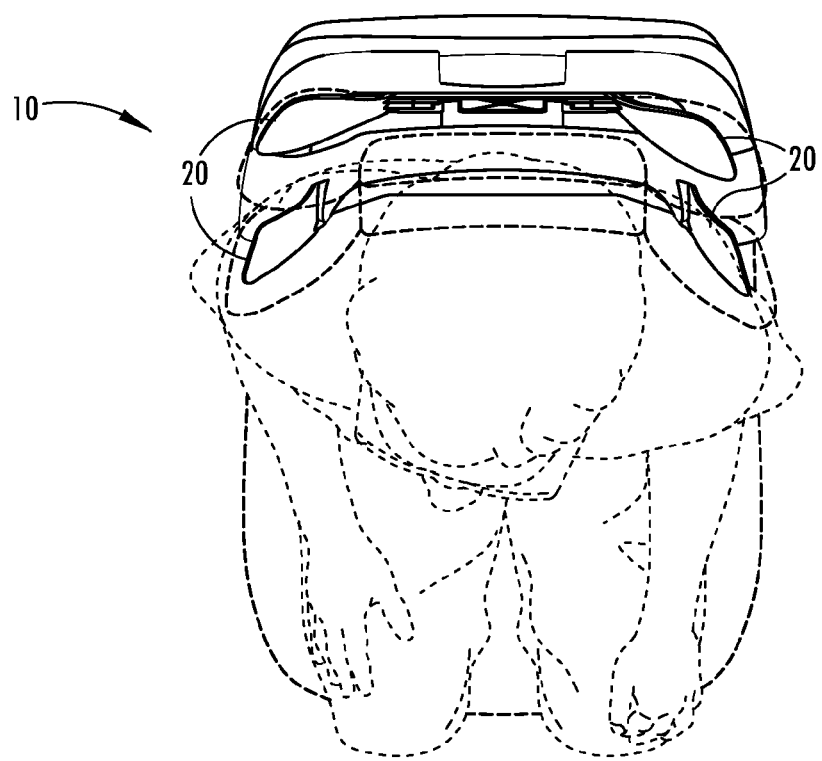
FIG. 18 is a top plan view of the suspension system shown in FIG. 16, having an occupant sitting in the vehicle seating assembly turned slightly to the right.
Figure 18A:
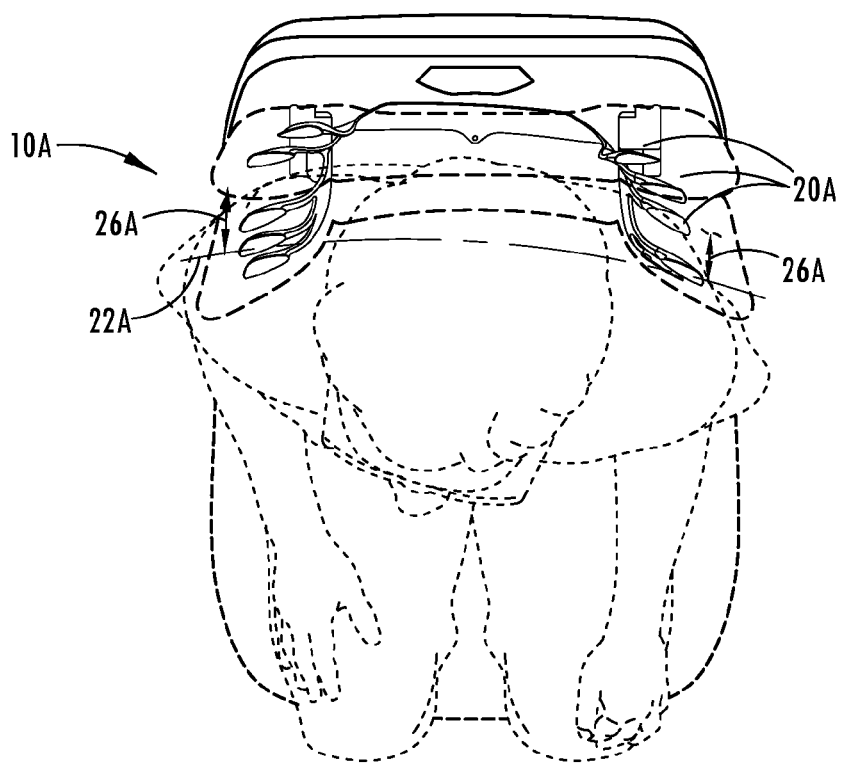
FIG. 18A is a top plan view of the additional embodiment of the suspension system shown in FIG. 16A, having an occupant sitting in the vehicle seating assembly turned slightly to the right.
Figure 19:
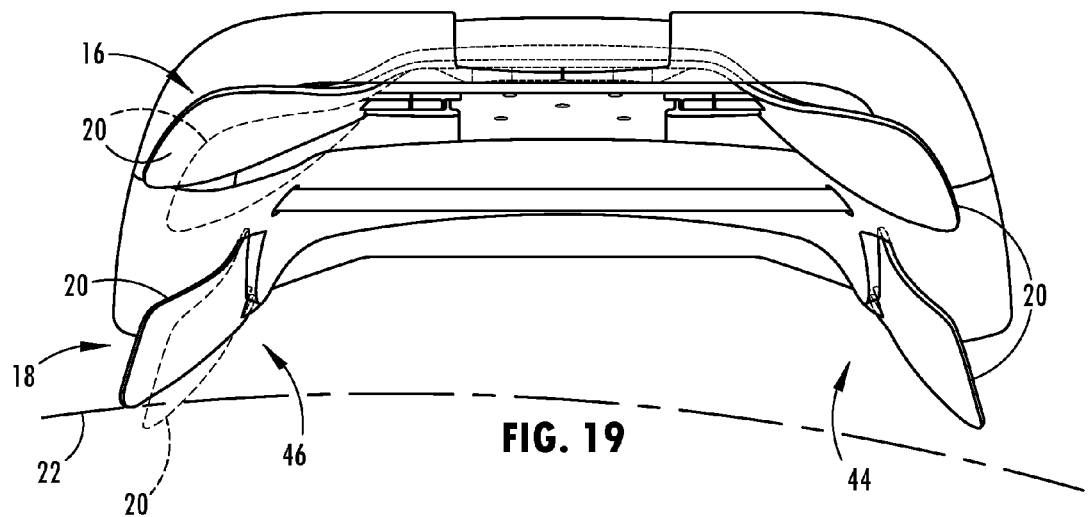
FIG. 19 is a top plan view of the suspension system shown in FIG. 18.
Figure 19A:
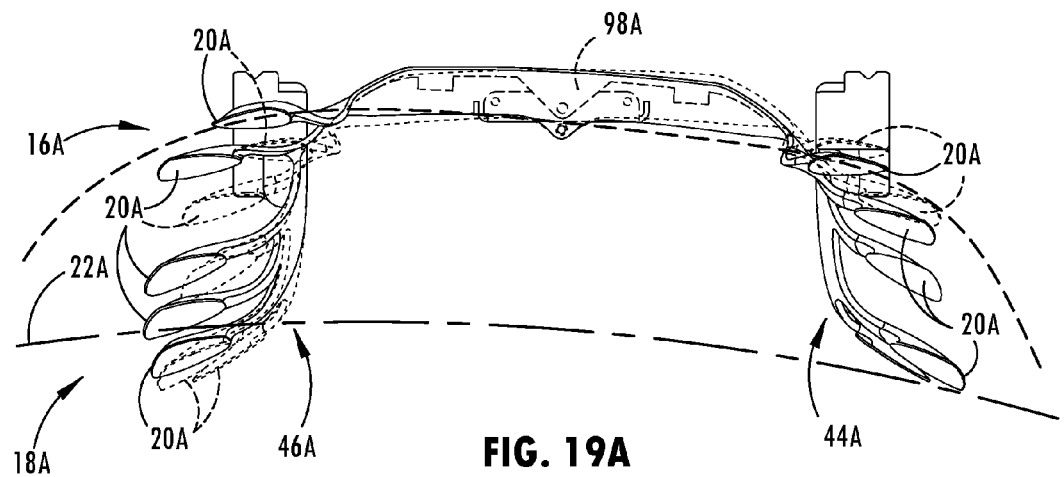
FIG. 19A is a top plan view of the additional embodiment of the suspension system shown in FIG. 18A.

As shown in FIGS. 18-19, the occupant has turned slightly to the right, adjusting the occupant's weight distribution on the suspension system 10. As such, the flexible member 20 on the right side of the upper-back suspension component 16 has flexed rearward, following the movement of the occupant's shoulders and upper back. The flexible member 20 extending from the second side portion 46 of the lower-back suspension component 18 also reacts to the occupant's illustrated movement by elastically deforming slightly rearward. The upper component is configured to allow for greater movement and deformation at the flexible members 20 to accommodate to greater range of potential movement in an occupant's shoulder area than the occupant's lower back area. Accordingly, the external peripheral gap 26 is slightly reduced proximate the second side portion 46 of the lower-back suspension component 18 and reduce relative more proximate the right side flexible member 20 of the upper-back suspension component 16.

In response to the occupant's movement, the additional embodiment, as shown in FIGS. 18A-19A, also includes the upper-back suspension component 16A pivoted laterally to the right about the fulcrum 98A. The lateral pivoting movement of the upper component forces the flexible members 20A on the right to move rearward and forces the flexible members 20A to the left to move forward, following the movement of the occupant's shoulders and upper back. Accordingly, the external peripheral gap 26A proximate the upper-back suspension component 16A is reduced on the right side of the passenger support 22A and slightly increased on the left side of the passenger support 22A.

Figure 20:
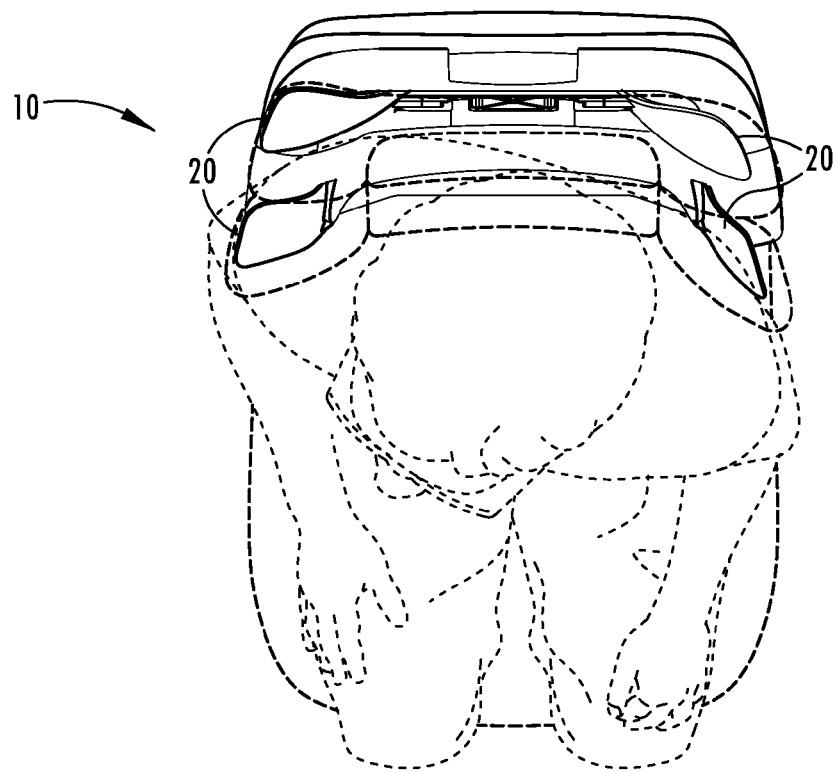
FIG. 20 is a top plan view of the suspension system shown in FIG. 18, having an occupant sitting in the vehicle seating assembly turned considerably to the right.
Figure 20A:
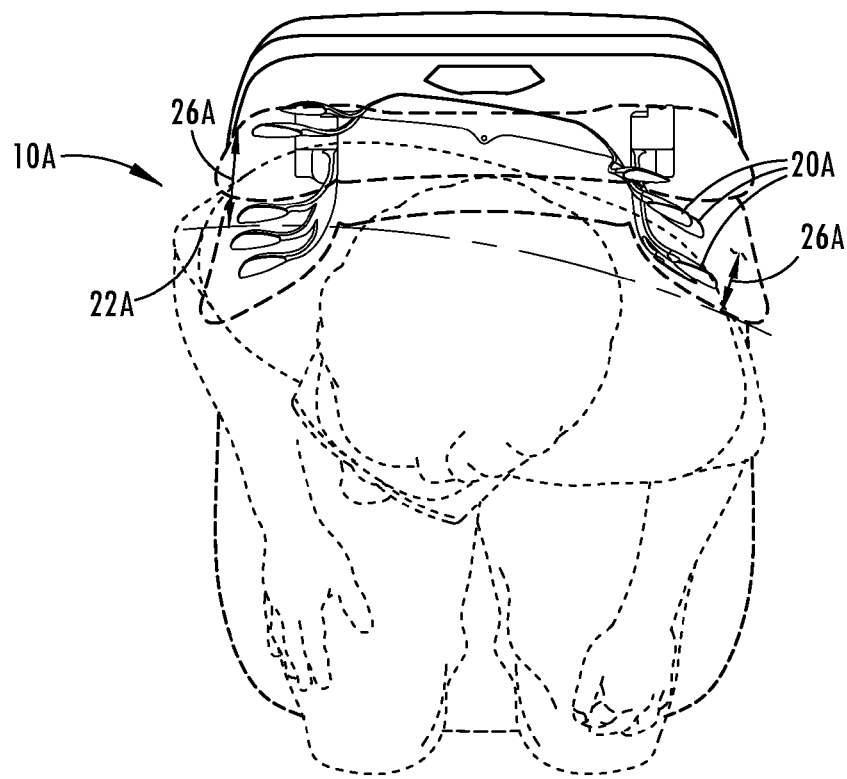
FIG. 20A is a top plan view of the additional embodiment of the suspension system shown in FIG. 18A, having an occupant sitting in the vehicle seating assembly turned considerably to the right.
Figure 21:
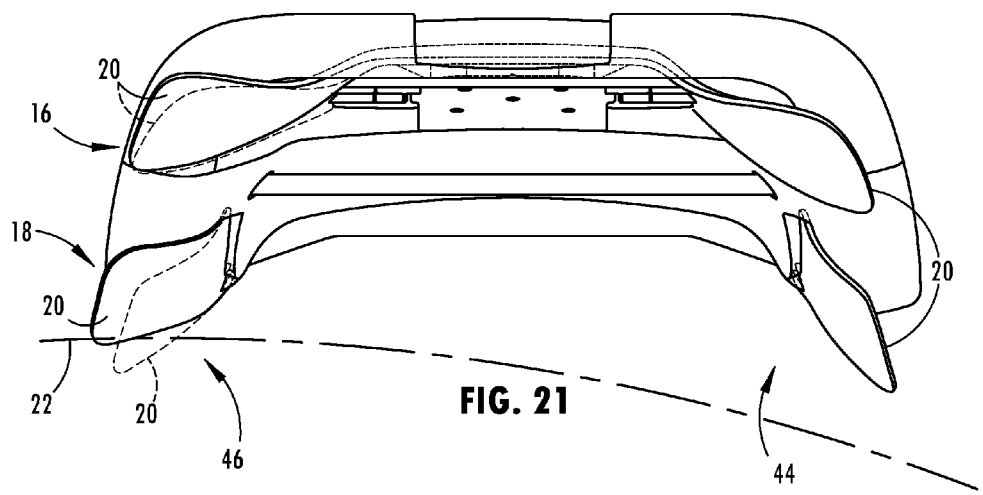
FIG. 21 is a top plan view of the suspension system shown in FIG. 20.
Figure 21A:
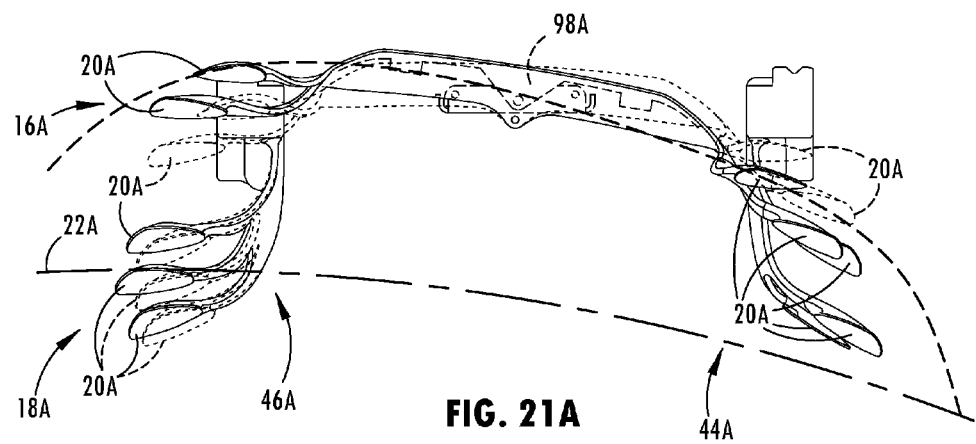
FIG. 21A is a top plan view of the additional embodiment of the suspension system shown in FIG. 20A.

As illustrated in FIGS. 20-21, the occupant has turned more to the right from the position shown in FIGS. 18-19, thereby further adjusting the occupant's weight distribution to the suspension system 10. In this position, the flexible member 20 of the upper-back suspension component 16 on the occupant's right side has elastically deformed further rearward to provide some resistance to the occupant's turning motion. The elastic deformation of the upper-back suspension component 16, therefore, provides support to the occupant's upper back that adapts to movement and position changes of the occupant. Additional deflection also occurs to the flexible member 20 extending from the second side portion 46 of the lower-back suspension component 18 by further elastically deforming rearward, thereby also providing adaptable support to the occupants' lower back. As such, the external peripheral gap 26 is further reduced on the right side of the passenger support 22. It is contemplated that movement of the occupant back to the forward facing position shown in FIGS. 16-17 will result in the flexible members 20 to elastically regain a substantially similar orientation and thereby regain the peripheral gap 26 with a substantially equal size on either side of the passenger support 22. Further, it is contemplated that movement of the occupant to the left that corresponds with the movement shown in FIGS. 18-21, will result in substantially mirrored deformation of the flexible members on the left side of the suspension system 10.

With reference again to the additional embodiment, as shown in FIGS. 20A-21A, the occupant is similarly turned more to the right, such that the upper-back suspension component 16A has continued to pivot laterally to the right about the fulcrum 98A. The pivotal movement about the fulcrum 98A again forces the flexible members 20A on the right to move further rearward and the flexible members 20A to the left to move further forward, in general alignment with the occupant's shoulders and upper back. The flexible members 20A of the upper-back suspension component 16A on the occupant's right side also elastically deform rearward to provide added resistance to the occupant's turning motion and adaptable support to the occupant's upper back.

Another alternative embodiment of the suspension system 10 is shown in FIGS. 22-24, similarly including an upper component 144 and a lower component 146. The upper component 144 has a first central body 148 this is pivotably coupled with a first cross bracket 150 spanning between the first and second side members 60, 62 of the metal structure 56. As such, the upper component 144 is configured to pivot laterally about the pivotal connection between the first central body 148 and the first cross bracket 150. The first central body 148 similarly includes two flexible members 20 extending forward and laterally from both sides of the first central body 148 to engage a passenger support, such that the upper component 144 is configured to pivot and elastically deform to provide resistance to the occupant's turning motion and adaptable support to the occupant's upper back. However, the upper component 144 of this embodiment does not pivot forward relative to the lower component 146.

The lower component 146 of this alternative embodiment, as shown in FIGS. 22-24, includes a second cross bracket 152 that spans between the first and second side members 60, 62 of the metal structure 56. The lower component 146 also includes a second central body 154 that is pivotably coupled with the second cross bracket 152. The second central body 154 includes an upper portion 156 and a lower portion 158, which each have two flexible members 20 extending forward and laterally outward from both the central body 154 to engage a passenger support. The flexible members 20 of the upper and lower portions 156, 158 of the lower component 146 that are adjacent to each other integrally join at the distal ends thereof. As such, the lower component 146 engages a passenger support 22 at six distal ends of the flexible members 20. The second cross bracket 152 includes a bulging portion 160 that is configured to fit between the upper and lower portions 156, 158 of the second central body 154, such that a pivot pin 162 extends though the upper portion 156, the bulging portion 160, and the lower portion 158 to provide a pivotal connection. The lower component 146, therefore, may pivot laterally about the pivot pin 162, similar to the upper-back suspension component 16, to provide pivoting and elastically deforming resistance to the occupant's entire back.

As shown in FIG. 24, the second cross bracket 152 engages a rear flange 164 of the metal structure 56 that extends laterally from an interior face 165 of the metal structure 56. A bolt 166 extends through a first hole 168 in the rear flange 164 and then through a second hole 170 in the second cross bracket 152 to attach the second cross bracket 152 to the metal structure 56. A bushing 172 is disposed between the second cross bracket 152 and the metal structure 56 to increase effectiveness of the suspension system and reduce wear between the metal structure 56 and second cross bracket 152. The first cross bracket 150 similarly engages the metal structure 56 with a bushing 172 and bolt 166.

Figure 25:
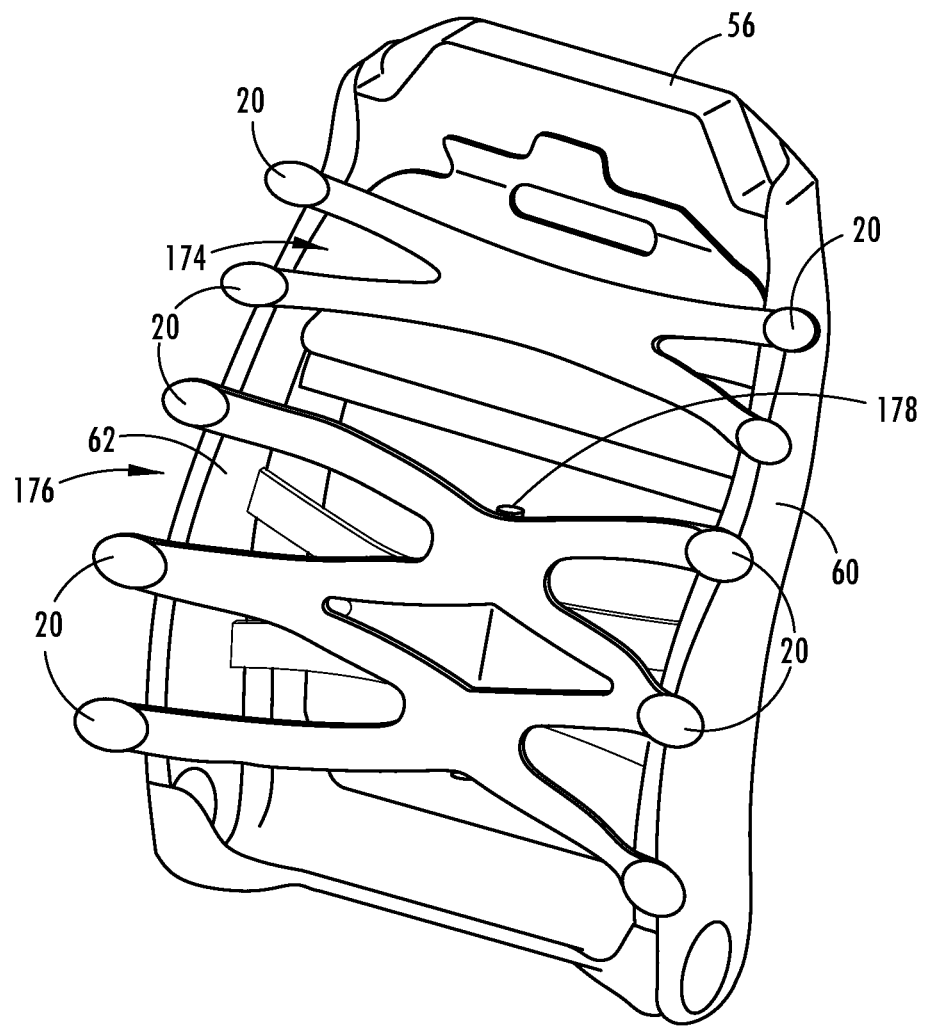
FIG. 25 is a top perspective view of an additional embodiment of a vehicle seating assembly.

Yet another alternative embodiment of the suspension system 10 is shown in FIG. 25, similarly including an upper component 174 and a lower component 176. In this embodiment, the upper and lower components 174, 176 span between the first and second side members 60, 62 of the metal structure 56 in more of a linear configuration. Further, the lower component 176 similarly includes a pivot pin 178 to allow lateral pivoting movement, in addition to the elastic deformation of the flexible members 20. It this embodiment the upper component 174 does not pivot laterally, and alternatively adapts to any shifts in an occupant's weight or position by elastic deformation of the flexible members 20.

Ultimately, the flexible members 20 shown in the various embodiments provide localized deflection for a passenger that corresponds with the passenger's shifts in weight, shoulder movements, and other common passenger movements that may occur during operation of the vehicle 25 or other occurrences when the passenger is seated in the seating assembly 24. The localized deflection of the flexible members 20 may be enhanced or customized for additional compliance to a passenger's size by using flexible members 20 with varied thickness, shaped, and overall construction, such as removing and replacing the finger shaped flexible members 20A of the additional embodiment, as shown in the A suffixed figures, with more rigid or more resilient flexible members 20A. The localized deflection and overall compliance provided by the flexible members 20, in conjunction with the entire suspension system 10, enhances the ride and comfort experienced by a passenger and provides the desired support characteristics.

Referring now to the additional embodiment of the seat suspension system 10 shown in FIGS. 26-30, the vehicle seating assembly 24 includes a front trim piece 200 spanning between front edges 202 of the first and second side supports 14, 16 of the seatback frame 15. The upper-back suspension component 16 of the illustrated additional embodiment is coupled with a central area 204 of the front trim piece 200 centrally between the first and second side supports 14, 16. More specifically, elongated flexible members 20 protrude forward and outward from the central area 204 of the front trim piece 200 to define a suspension unit 206 of the additional embodiment of the upper-back suspension component 16 provided herein. The passenger support 22 includes a unitary panel 208 that extends vertically between the upper-back and lower-back suspension components 16, 18. The passenger support 22 has a periphery 23 that is coupled to the distal ends 94 of the flexible members 20, thereby suspending the passenger support 22 away from the seatback frame 15.

Figure 26:
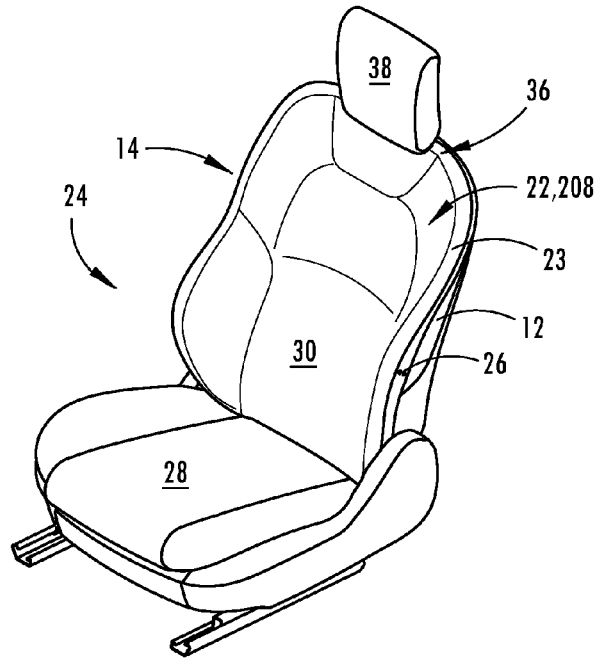
FIG. 26 is a top perspective view of an additional embodiment of a seating assembly having a seat suspension system.

As shown in FIG. 26, the vehicle seating assembly 24 of the additional embodiment similarly includes first and second side supports 12, 14 that define the seatback frame 15, which pivotally couples with a rear portion of the seat 28. The top portion 36 of the seatback 30 extends horizontally between the first and second side supports 12, 14 and engages the head restraint 38. The unitary panel 208 of the passenger support 22 extends between the seat 28 and the head restraint 38 and is spaced from the seatback frame 15 to define the external peripheral gap 26 about the periphery 23 of the passenger support 22. As previously mentioned, it is contemplated that the head restraint 38 may be integrated with the top portion 36 of the seatback 30 or the head restraint 38 may otherwise not be included on the vehicle seating assembly 24.

Figure 27:
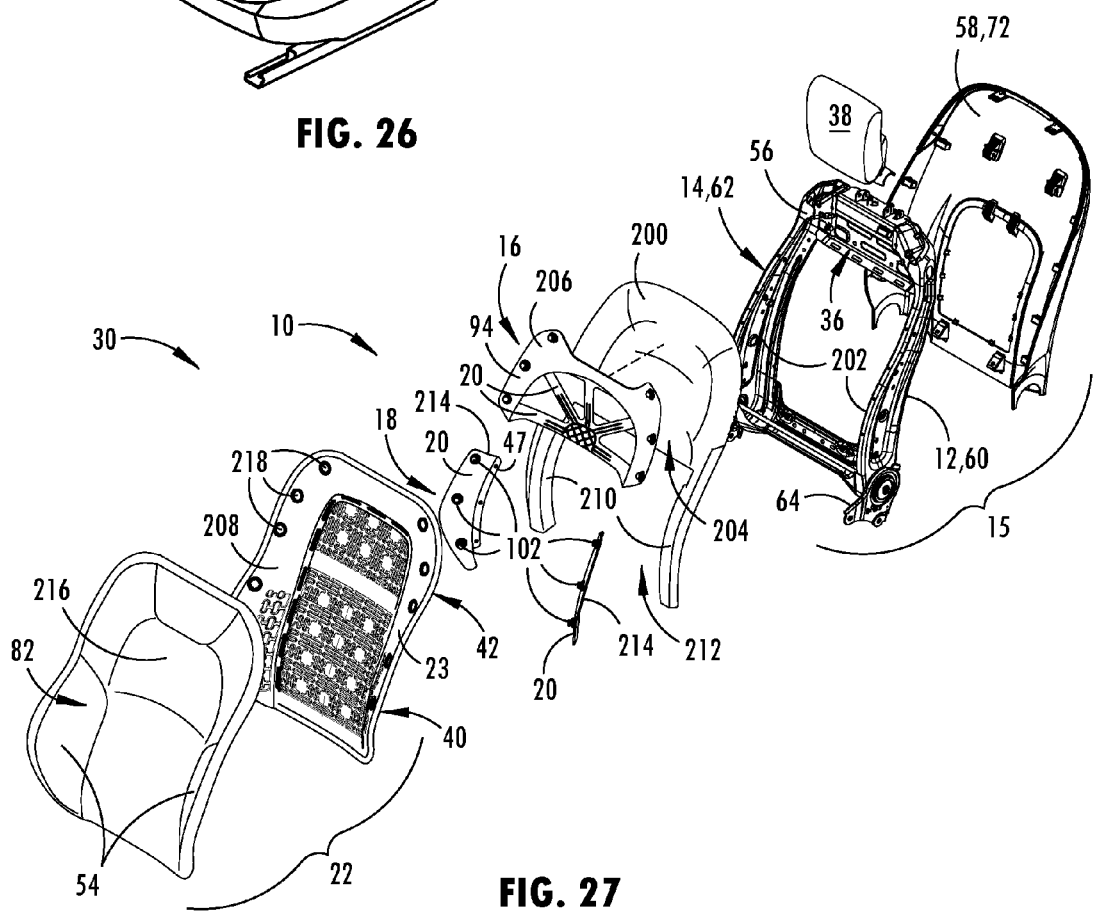
FIG. 27 is an exploded top perspective view of a seatback of the vehicle seating assembly shown in FIG. 26.

The seatback frame 15 of the seatback 30, as illustrated in FIG. 27, includes the metal structure 56 and a plastic trim shell 58 that is configured to substantially enclose the metal structure 56. The lower ends of the first and second side supports 12, 14 include a recliner bracket 64 for pivoting the seatback 30. More specifically, the metal structure 56 includes first and second members 60, 62 that pivotally couple with recliner bracket 64 to provide for the pivotal movement of the seatback frame 15. The front trim piece 200 is coupled between the first and second side supports 12, 14 and engages the back trim panel 72 along the side members 60, 62 to substantially enclose the metal structure 56 of the seatback frame 15. Lower lateral sections 210 of the front trim piece 200 extend vertically along the side members 60, 62 of the metal structure 56 to define an opening 212 between the first and second side supports 12, 14 proximate the lower-back suspension component 18. The lower-back suspension component 18 is provided with a pair of bolster members 214, which are also referred to as first and second side portions 44, 46, that couple with the lower lateral sections 210 of the front trim piece 200 and extend forward for engaging the lower segment 40 of the passenger support 22. As previously explained, the pair of bolster members 214 each include a flexible member 20 that extends from the base section 47 to operably couple with the lower segment 40 of the passenger support 22, namely the angled side bolsters 54 of the passenger support 22, which are configured to prevent lateral movement of an occupant relative to the passenger support 22. The base sections 47 of the bolster members 214 may attach to the front trim piece 200 and/or the seatback frame 15. As also previously mentioned, the bolster members 214 may include a single flexible member 20 with at least one connection feature, such as a protrusion 102, for snap-fitting to the passenger support 22 or may include additional forward and outwardly extending flexible members 20.

Still referring to FIG. 27, the illustrated embodiment includes the unitary panel 208 of the passenger support 22 that integrates the upper and lower segments 42, 40 into a single piece. The lower segment 40 of the passenger support 22 couples with the bolster members 214 of the lower-back suspension component 18. Likewise, the upper segment 42 of the passenger support 22 operably couples with the distal ends 94 of the flexible members 20 provided on the upper-back suspension component 16. Similar to the previously illustrated and described embodiments of the passenger support 22, the unitary panel 208 includes apertures that extend through essential areas of the unitary panel 208 to provide added flexibility for conforming to the contours of an occupant's back, while allowing areas for ventilation to a passenger support surface 216. The periphery 23 of the unitary panel 208 includes a series of attachment openings 218 that are aligned to snap-fit into engagement with protrusions 102 on the distal ends 94 of the flexible members 20. As also shown in FIG. 27, the passenger support 22 includes a cover stock 82 that covers a front surface of the unitary panel 208 to define the passenger support surface 216 on a front side thereof. It is contemplated that the cover stock 82 may include a cushioned backing and an intermediary cushion may be disposed between the cover stock 82 and the unitary panel 208 to define the passenger support 22.

Figure 28:
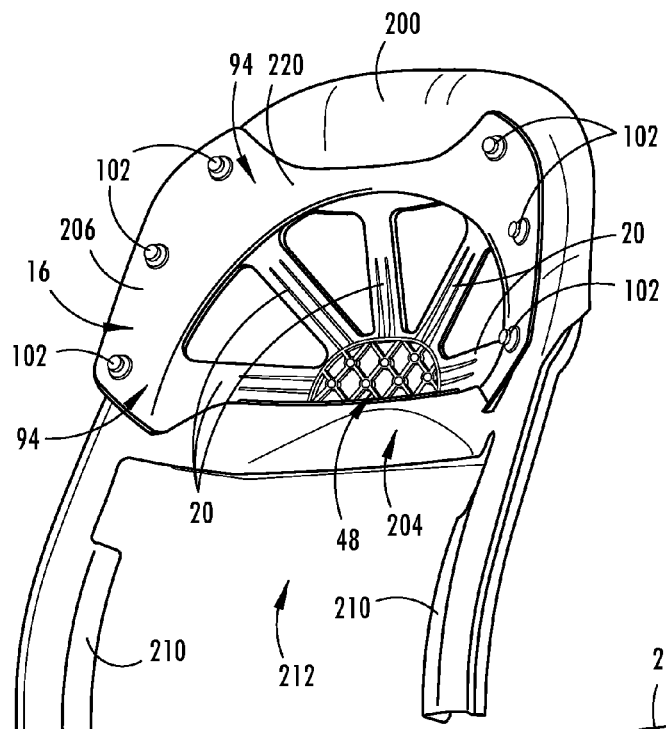
FIG. 28 is a front perspective view of an upper-back suspension component coupled with a central area of a front trim piece of the seatback shown in FIG. 27.

With reference to FIG. 28, the front trim piece 200 is illustrated with the upper-back suspension component 16 fixedly coupled to the central area 204 of the front trim piece 200. The attachment between the upper-back suspension component 16 and the front trim piece 200 may be effectuated with adhesive, friction welding, fasteners, or other conceivable means of rigid attachment. It is also contemplated that the upper-back suspension component 16 may be integrally formed with the front trim piece 200 to define a singular piece. Furthermore, it is contemplated that the bolster members 214 of the lower-back suspension component 18 may also be integrally formed with the front trim piece 200 in additional embodiments. A central body 48 of the upper-back suspension component 16 is directly attached to the central area 204 of the front trim piece 200. Two flexible members 20 protrude from opposing lateral sides of the central body 48 and three flexible members protrude upward from the central body 48. The distal ends 94 of the flexible members 20 that protrude from the central body 48 interconnect to define a U-shaped engagement flange 220, whereby the flexible members 20 suspend the engagement flange 220 away from the front trim piece 200.

Figure 29:
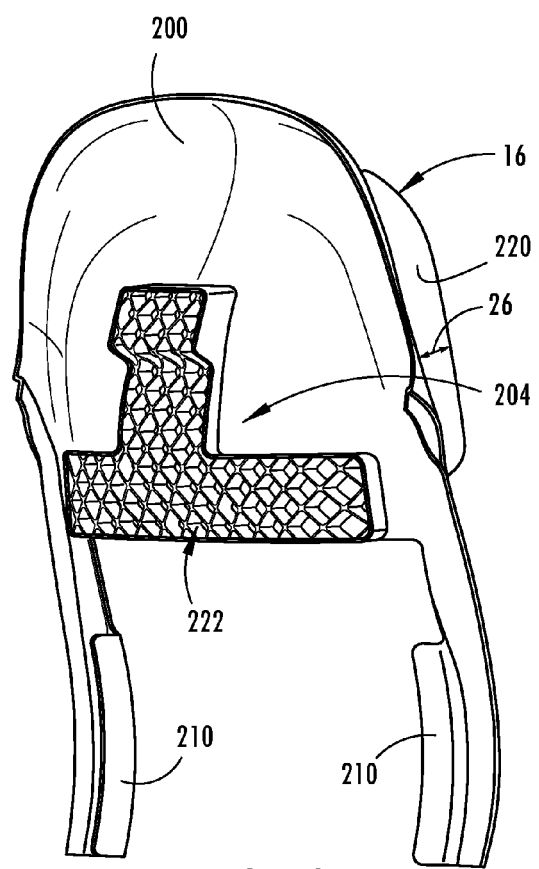
FIG. 29 is a rear perspective view of the front trim piece shown in FIG. 28.

As shown in FIGS. 28-29, to provide the spacing 26 between the distal ends 94 of the flexible members 20 and the front trim piece 200, the central area 204 of the front trim piece 200 is concaved-shaped rearward into the seatback 30, namely into a space provided between the side members 12, 14 of the seatback frame 15 (FIG. 27). This concave shape thereby provides the spacing for the lateral portions of the passenger support 22 (FIG. 27) to resiliently move rearward upon deflection of the upper-back suspension component 16, while also providing a relatively thin seatback design that reduces the amount of space the seating assembly 24 occupies within the vehicle. As shown in FIG. 29, a rear portion of the central area 204 of the front trim piece 200 is provided with a network of reinforcement flanges 222, in a grid-like pattern, to increase rigidity and strength of the front trim piece 200 proximate the attachment with the upper-back suspension component 16. It is contemplated that the rigidity may also be provided with an alternatively shaped network of reinforcement flanges, a separately attached reinforcement structure, or the use of other conceivable materials or structures known to increase rigidity and strength of a component proximate an area of force application.

Figure 30:
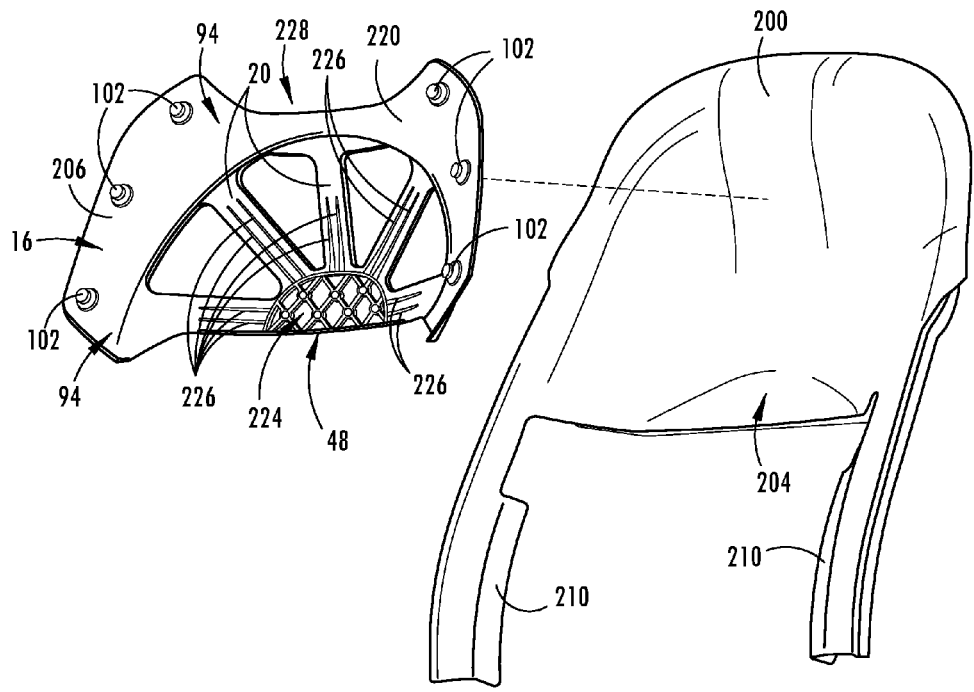
FIG. 30 is an exploded front perspective view of the upper-back suspension component and the front trim piece shown in FIG. 28.
Figure 31:
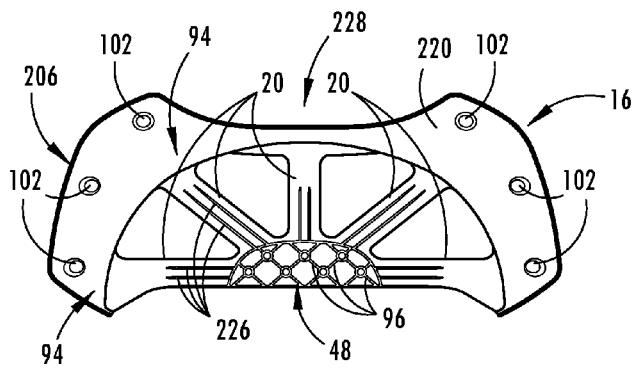
FIG. 31 is a front elevation view of the upper-back suspension component of FIG. 30.
Figure 32:
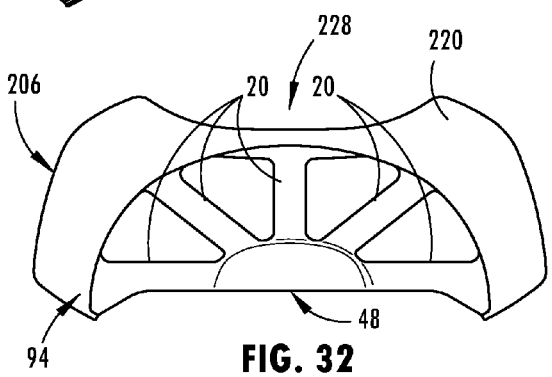
FIG. 32 is a rear elevation view of the upper-back suspension component of FIG. 30.

Referring now to FIGS. 30-32, the front surface of the central body 48 of the upper-back suspension component 16 also includes a grid-shaped network of reinforcement flanges 224, also referred to as structural flanges 96, to similarly increase the strength of the central body 48. In the illustrated embodiment, the flexible members 20 that protrude upward and outward from the central body 48 are also provided with reinforcement flanges 226 along the front surfaces thereof. The reinforcement flanges 226 on the flexible members 20 extend linearly in alignment with the longitudinal extent of each respective flexible member 20. Also, the reinforcement flanges 226 on the flexible members 20 taper in thickness from the central body 48 to the distal ends 94, such that the reinforcement flanges 226 diminish at an intermediate portion of each flexible member 20 between the central body 48 and the distal ends 94. The arrangement of these reinforcement flanges 226 and their respective points of termination are configured to provide independent compliance rearward under the weight of an occupant in a comfortable and yet supporting manner. As such, the lateral portions of the passenger support 22 are independently compliant rearward upon the resilient deflection of the flexible members 20. As also illustrated, the U-shaped engagement flange 220 that defines the distal ends 94 of the flexible members 20 on the upper-back support component 16 includes a cutout region 228 at a top portion thereof to allow for attachment of the head restraint 38. It is contemplated that the U-shaped engagement flange 220 may include various other shapes or configurations with more or fewer flexible members 20, such as segmented engagement flanges for the flexible members on opposing lateral sides of the upper-back suspension component 16. Moreover, it is conceivable that the flexible members 20 of the upper-back suspension component 16 may be alternatively configured, such as those configurations shown and described in other portions of the present application.

Figure 33:
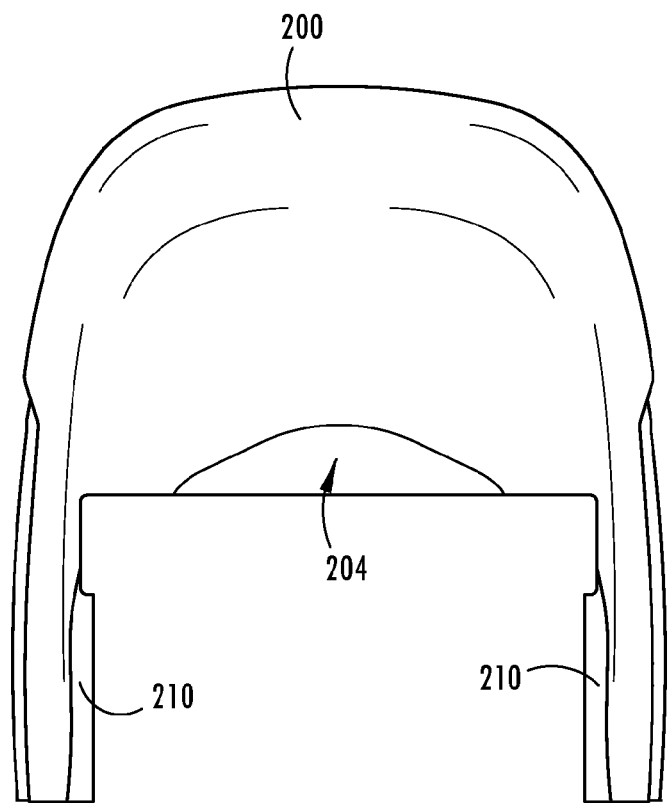
FIG. 33 is a front elevation view of the front trim piece of FIG. 30.
Figure 34:
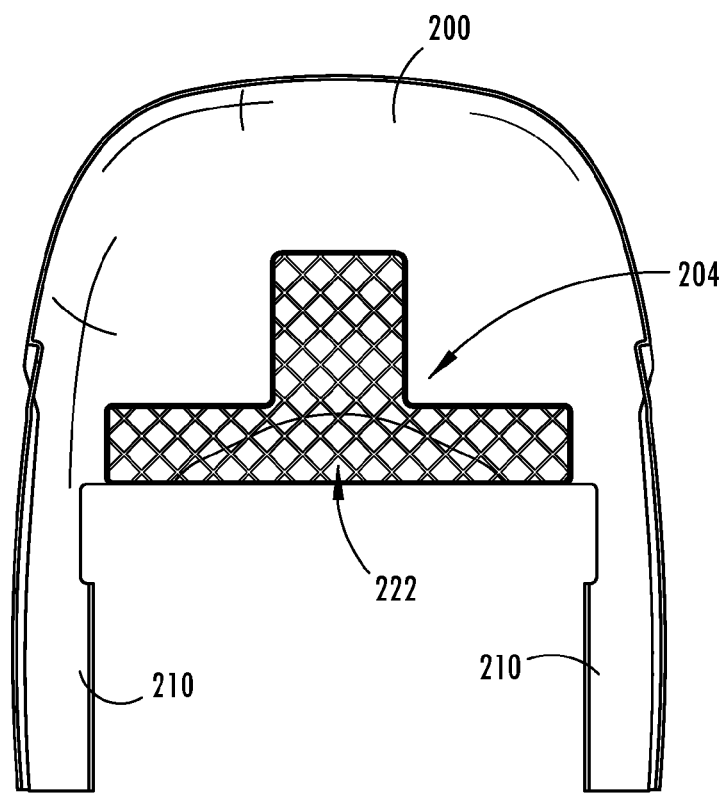
FIG. 34 is a rear elevation view of the front trim piece of FIG. 30.

With reference to FIGS. 33-34, the embodiment of the front trim piece 200 shown has the concave-shaped central area 204 formed with a solid and consistent interior surface spanning between the side supports 12, 14 of the seatback frame 15. In additional embodiments, it is contemplated that the interior surface may be interrupted with openings to provide ventilation to the passenger support. The lower lateral sections 210 of the front trim piece 200 extend downward from the central body 48 along the side supports 12, 14 of the seatback frame 15 to provide the opening 212 between the side members 60, 62 of the metal structure 56, such as for an air distribution system, a massage system, or other conceivable systems that may be packaged in such a space.

Figure 35:
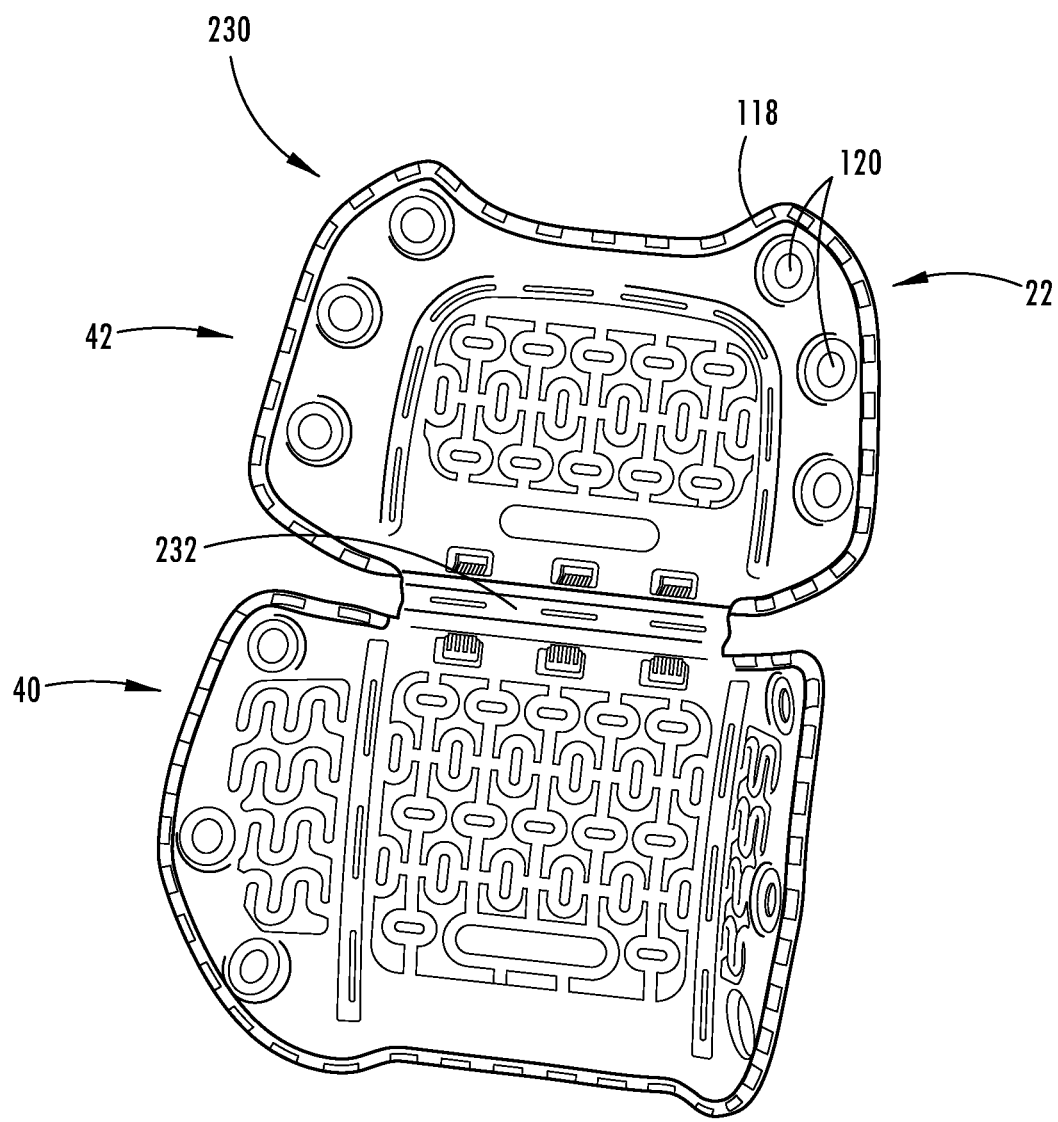
FIG. 35 is a front perspective view of an additional embodiment of the passenger support panel.

An additional embodiment of a unitary panel 230 of the passenger support 22 is shown in FIG. 35. In the embodiment illustrated in FIG. 35, the upper and lower segments 42, 40 are integrally formed as a unitary piece, similar to the previously discussed embodiment; however, a living hinge 232 is provided between the upper and lower segments 42, 40. The living hinge 232 provides pivotal movement between the upper and lower segments 42, 40 of the unitary panel 230 and added flexibility therebetween. As such, the lateral portions of the upper segment 42 of the passenger support 22 may be independently compliant rearward under the weight of an occupant relative to the lateral portions of the lower segment 40 of the passenger support 22.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle seat suspension system, comprising:
    a seatback frame;
    a front trim piece coupled with the seatback frame and having an exposed peripheral edge;
    a suspension component positioned vehicle forward of the front trim piece and having elongate flexible members protruding outwardly therefrom; and
    a passenger support having a periphery coupled to distal ends of the elongate flexible members and suspended away from the seatback frame.

2. The vehicle seat suspension system of claim 1, wherein lateral portions of the passenger support are independently compliant rearward upon deflection of the suspension component.

3. The vehicle seat suspension system of claim 1, wherein the suspension component is integrally formed with the front trim piece.

4. The vehicle seat suspension system of claim 1, further comprising:
    a pair of bolster members coupled with lower lateral sections of the front trim piece and extending forward to couple with a lower segment of the passenger support.

5. The vehicle seat suspension system of claim 4, wherein the passenger support includes a unitary piece extending vertically between the suspension component and the pair of bolster members for supporting an upper and lower back of an occupant, respectively.

6. The vehicle seat suspension system of claim 1, wherein lower ends of first and second side supports pivotally couple with a recliner bracket for pivoting the seatback frame.

7. The vehicle seat suspension system of claim 1, wherein the passenger support is snap-fit to the distal ends of the elongate flexible members and includes a cover stock defining a back support surface.

8. The vehicle seat suspension system of claim 1, further comprising:
    an external peripheral gap defined between the passenger support and the seatback frame.

9. A vehicle seating assembly, comprising:
    a seatback frame;
    a trim piece with an exposed peripheral edge and operably coupled with the seatback frame;
    an upper-back suspension component coupled with the trim piece and having elongate flexible members protruding therefrom; and
    a passenger support having lateral portions coupled to the flexible members and spaced from the seatback frame for resiliently moving rearward upon deflection of the suspension component.

10. The vehicle seating assembly of claim 9, wherein a periphery of the passenger support is attached to distal ends of the elongate flexible members and is suspended away from front edges of side supports by the suspension component.

11. The vehicle seating assembly of claim 9, wherein the suspension component is fixedly attached to the front trim piece, and wherein the passenger support includes a cover stock defining a back support surface.

12. The vehicle seating assembly of claim 9, further comprising:
    a lower-back suspension component having a pair of bolster members coupled with lower sections of the side supports and extending forward to couple with the passenger support.

13. The vehicle seating assembly of claim 9, wherein lower ends of the side supports are pivotally coupled to a seat.

14. The vehicle seating assembly of claim 9, wherein the upper-back suspension component includes a central body coupled with the trim piece and first and second flexible members protruding from opposing lateral sides of the central body.

15. A seat suspension system, comprising:
    an exposed trim piece coupled between side supports of a seatback frame;
    a suspension component coupled with the exposed trim piece and having elongate flexible members protruding forward and outward therefrom; and
    a passenger support having a periphery coupled to distal ends of the elongate flexible members, and flexible rearward upon resilient deflection of the suspension component, a rear of the passenger support being partially exposed.

16. The seat suspension system of claim 15, wherein lateral portions of the passenger support are independently compliant rearward under the weight of an occupant.

17. The seat suspension system of claim 15, wherein the suspension component is integrally formed with the exposed trim piece.

18. The seat suspension system of claim 15, further comprising:
    a pair of bolster members coupled with lower lateral sections of the exposed trim piece and extending forward to couple with a lower segment of the passenger support.

19. The seat suspension system of claim 18, wherein the passenger support includes a unitary panel extending vertically between the suspension component and the pair of bolster members for supporting an upper and lower back of an occupant, respectively.

20. The seat suspension system of claim 15, wherein the passenger support includes a panel that is snap-fit to the distal ends of the elongate flexible members and includes a cover stock defining a back support surface.

* * * * *